(12) United States Patent
Cui et al.

(10) Patent No.: US 12,012,345 B2
(45) Date of Patent: Jun. 18, 2024

(54) ORGANIC WASTEWATER TREATMENT BY A SINGLE-ATOM CATALYTIC FENTON FILTER AND ELECTROLYTICALLY-GENERATED $H_2O_2$

(71) Applicant: The Board of Trustees of the Leland Stanford Junior University, Stanford, CA (US)

(72) Inventors: Yi Cui, Stanford, CA (US); Jinwei Xu, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 666 days.

(21) Appl. No.: 17/152,318

(22) Filed: Jan. 19, 2021

(65) Prior Publication Data
US 2021/0230030 A1    Jul. 29, 2021

Related U.S. Application Data

(60) Provisional application No. 62/964,909, filed on Jan. 23, 2020.

(51) Int. Cl.
*C02F 1/72* (2023.01)
*B01J 23/72* (2006.01)
*C02F 1/461* (2023.01)

(52) U.S. Cl.
CPC .............. *C02F 1/725* (2013.01); *B01J 23/72* (2013.01); *C02F 1/461* (2013.01); *C02F 2305/023* (2013.01); *C02F 2305/026* (2013.01); *C02F 2305/10* (2013.01)

(58) Field of Classification Search
CPC ...... C02F 1/72; C02F 1/46; C02F 1/32; C02F 1/48; C02F 1/30; B01J 23/72; B01J 32/34; B01J 32/36
See application file for complete search history.

(56) References Cited

U.S. PATENT DOCUMENTS

2017/0370013  A1*  12/2017  Bahar .................. C25B 9/23

OTHER PUBLICATIONS

A Graphite-phase Carbon Nitride Heterogeneous Fenton Catalyst Preparation Method and Application Thereof; CN 108380235 A; Inventor Fan, Jin-hong (Year: 2018).*

* cited by examiner

*Primary Examiner* — Walter D. Griffin
*Assistant Examiner* — Cameron J Allen
(74) *Attorney, Agent, or Firm* — Foley & Lardner LLP

(57) ABSTRACT

Disclosed herein are Fenton filters comprising a porous substrate and a catalyst coating the porous substrate, wherein the catalyst includes a matrix and single metal atoms incorporated in the matrix. Also disclosed herein are methods of generating radicals from an oxidant, electrolyzers, methods of generating hydrogen peroxide, and water treatment systems.

33 Claims, 15 Drawing Sheets

ORGANIC WASTEWATER TREATMENT BY A SINGLE-ATOM CATALYTIC FENTON FILTER AND ELECTROLYTICALLY-GENERATED $H_2O_2$

CROSS-REFERENCE TO RELATED APPLICATIONS

This application claims the benefit of and priority to U.S. Patent Application No. 62/964,909, filed on Jan. 23, 2020, the contents of which are incorporated herein in their entirety.

BACKGROUND

Advanced oxidation processes (AOPs) that generate hydroxyl radical (·OH) to destroy organic contaminants are promising solutions to treat the diverse array of organic contaminants released in wastewater. Comparative AOPs utilize ultraviolet (UV) photolysis of $H_2O_2$ to generate ·OH. However, this process involves substantial energy and chemical inputs.

Over 20% of global freshwater withdrawals are used for industry, carrying out diverse kinds of wastes. Among those, organic contaminants pose significant risks to human and ecosystem health. Major dischargers include pharmaceutical companies, textile manufacturers, paper mills, pesticide factories, and many others. Advanced Oxidation Processes (AOPs), which generate highly reactive radicals (·OH, ·Cl, and so forth) from soluble oxidants (e.g., $H_2O_2$, $O_3$, and HOCl), are state-of-the-art treatment processes for diverse industrial discharges, because the radicals react rapidly and non-selectively to destroy organic contaminants. However, despite significant developments in AOPs, two fundamental challenges have thus far constrained the practical use of comparative AOPs.

The first challenge facing AOPs is the efficient activation of the oxidant, such as $H_2O_2$. Ultraviolet (UV) light is used in comparative AOPs to cleave the O—O bond of $H_2O_2$ to generate ·OH, yet this process is highly energy-intensive, and the mercury inside UV lamps raises safety concerns. Therefore, finding a catalyst to activate $H_2O_2$ without energy input is desired for next-generation AOPs. The second challenge facing AOPs is the efficient production of $H_2O_2$. The anthraquinone process involves complex infrastructure and is not feasible for small-scale operations. Besides, the hazards associated with the transportation and storage of $H_2O_2$ further hinder the implementation of AOPs in remote areas and isolated communities.

It is against this background that a need arose to develop the embodiments described herein.

SUMMARY

Some embodiments of the present disclosure are directed to a Fenton filter comprising: a porous substrate and a catalyst coating the porous substrate, wherein the catalyst includes a matrix and single metal atoms incorporated in the matrix. In some embodiments, the matrix includes an organic material. In some embodiments, the matrix includes heterocycles bonded to one another. In some embodiments, the heterocycles include carbon-nitrogen heterocycles. In some embodiments, the heterocycles are aromatic. In some embodiments, the heterocycles include heptazine units. In some embodiments, the matrix includes graphitic carbon nitride. In some embodiments, the single metal atoms include single transition-metal atoms. In some embodiments, the single metal atoms include single copper atoms. In some embodiments, the single metal atoms have non-zero oxidation states. In some embodiments, the single metal atoms are incorporated within coordination sites in the matrix. In some embodiments, the single metal atoms are spaced apart from one another in the matrix. In some embodiments, a molar ratio of the single metal atoms to carbon atoms included in the matrix is in a range of about 1/50 or greater, about 1/40 or greater, about 1/30 or greater, or about 1/20 or greater, and up to about 1/10 or greater. In some embodiments, the porous substrate is fibrous and includes fibers, and the fibers are coated with the catalyst.

Additional embodiments of the present disclosure include a method of generating radicals from an oxidant includes providing the Fenton filter of any of the embodiments herein, and passing a solution including the oxidant through the Fenton filter to generate radicals from the oxidant. In some embodiments, the oxidant includes hydrogen peroxide. In some embodiments, the radicals include hydroxyl radicals.

Additional embodiments of the present disclosure include an electrolyzer comprising: a gas chamber; an oxygen evolution reaction (OER) chamber fluidly connected to the gas chamber; an oxygen reduction reaction (ORR) chamber disposed between the gas chamber and the OER chamber; a gas diffusion electrode disposed between the gas chamber and the ORR chamber; a proton exchange membrane disposed between the ORR chamber and the OER chamber; an anode disposed in the OER chamber; and an electrical power source connected to the gas diffusion electrode and the anode. In some embodiments, the gas diffusion electrode includes a porous current collector, a gas diffusion layer coating a first side of the porous current collector, and an ORR catalyst incorporated in the porous current collector. In some embodiments, the gas diffusion layer faces toward the gas chamber, and a second, opposite side of the porous current collector faces toward the ORR chamber. In some embodiments, the porous current collector is fibrous and includes fibers, and the ORR catalyst is incorporated in spaces between the fibers. v the gas diffusion layer is a porous polymer layer. In some embodiments, the gas diffusion layer is a porous polyolefin layer. In some embodiments, a pore size of the gas diffusion layer is smaller than a pore size of the porous current collector. In some embodiments, the ORR catalyst includes oxidized carbon particles. In some embodiments, the anode includes a current collector and an OER catalyst coating the current collector. In some embodiments, the current collector is a metallic mesh. In some embodiments, the OER catalyst includes a metal oxide.

Additional embodiments of the present disclosure include a method of generating hydrogen peroxide comprising: providing the electrolyzer of any of the embodiments herein; conveying air into the OER chamber to generate oxygen; conveying oxygen from the OER chamber to the gas chamber; and conveying an electrolyte through the ORR chamber to generate hydrogen peroxide resulting from reduction of oxygen from the gas chamber passing through the gas diffusion electrode.

Additional embodiments of the present disclosure include a water treatment system comprising: the electrolyzer of any of the embodiments herein, and the Fenton filter of any of the embodiments herein fluidly connected to and downstream from the electrolyzer. In some embodiments, the water treatment system further comprises an oxidant filter fluidly connected to and downstream from the Fenton filter. In some embodiments, the oxidant filter includes a porous substrate and a disproportionation catalyst coating the porous substrate. In some embodiments, the disproportionation catalyst includes a metal oxide. In some embodiments, the porous substrate is fibrous and includes fibers, and the fibers are coated with the disproportionation catalyst.

BRIEF DESCRIPTION OF THE DRAWINGS

FIG. 1a shows structural illustration of Cu—$C_3N_4$. FIG. 1b shows an aberration-corrected HR-TEM image of Cu—$C_3N_4$ showing the absence of crystalline structure. Darker area in the top-left corner is due to the lacey carbon of TEM grid. Scale bar, 20 nm. FIG. 1c shows an aberration-corrected HAADF-STEM image of Cu—$C_3N_4$. Circles indicate Cu single atoms. Scale bar, 2 nm. FIG. 1d shows a normalized $k^2$-weighted Fourier transform of the EXAFS spectra of Cu—$C_3N_4$ and other reference materials in radial distance. FIG. 1e shows an XPS Cu 2p spectrum and Cu LMM Auger spectrum (inset) of Cu—$C_3N_4$. The black lines show the raw data (open circles), whereas the colored lines correspond to the deconvoluted components. FIG. 1f shows an FTIR spectra of Cu—$C_3N_4$ and undoped $C_3N_4$.

FIG. 2a shows degradation of about 10 μM RhB with the presence of about 1 g/L $H_2O_2$ and different catalysts. Reaction conditions: about 10 mL aqueous solution, about 1 g/L catalyst (if present), pH=about 7 (pH is adjusted to about 7 at the beginning of reaction without buffer control). FIG. 2b shows LC-MS chromatograms of the reaction solution at different degradation time intervals. The reaction conditions are the same as those for panel a, with Cu—$C_3N_4$ as the catalyst. FIG. 2c shows TOC removal during the degradation of about 50 μM RhB in the presence of about 1 g/L $H_2O_2$ and about 1 g/L Cu—$C_3N_4$. Reaction conditions: about 100 mL aqueous solution, pH=about 7. FIG. 2d shows an energy diagram illustrating the two steps of the oxidation of $RH_2$ by $H_2O_2$. The upward direction of the y-axis indicates lower redox potential (φ) and higher electron energy (E). An arrow connecting two redox couples (horizontal lines) denotes an electron-transfer process, namely a redox reaction. FIG. 2e shows an energy diagram of the catalyst/solution interface. FIG. 2f shows a possible catalytic cycle of $H_2O_2$ activation by Cu—$C_3N_4$. Each step is denoted by an arrow in the energy diagram in FIG. 2e.

FIG. 3a is a photo of a proof-of-concept Fenton filter. Cross-sectional area, about 1 $cm^2$. Length, about 5 cm. Scale bar, 5 cm. FIG. 3b is an SEM image of the filter media. Scale bar, 100 μm. Inset, magnified SEM image showing the Cu—$C_3N_4$ catalyst coated on each carbon fiber. Scale bar, 5 μm. FIG. 3c shows dye removal efficiency and Cu concentration in effluent as functions of filtration time. Flow rate, about 10 mL/h. LHSV, about 2 $h^{-1}$. $H_2O_2$ concentration, about 1 g/L. Pollutant, about 10 ppm RhB for the first 100 hours, changed to about 10 ppm MB for the second 100 hours.

FIG. 4a shows a schematic drawing of the GDE for 2e-ORR. $O_2$ diffuses in the gas phase through the porous PE to the gas-catalyst-electrolyte interface, and then is reduced by the electrons transported from the carbon paper. FIG. 4b shows a cross-sectional SEM image of the GDE, with dashed lines denoting the boundaries between each component. The top surface is visible because the sample is tilted. Scale bar, 50 μm. FIG. 4c shows a magnified SEM image of the porous PE showing interconnected micron-sized pores, which provide the gas diffusion pathway and prevent flooding. Scale bar, 2 μm. FIG. 4d shows a comparison of the Tafel plots of a GDE supplied with pure $O_2$, a GDE supplied with atmospheric air, and a carbon paper electrode immersed in electrolyte. All the electrodes were loaded with the same amount of catalyst (about 0.5 mg/$cm^2$). Electrolyte, about 0.1 M $Na_2SO_4$. FIG. 4e shows LSV curves of the $IrO_2$ anode before and after 200 cycles of continuous CV scanning in about 0.1 M $Na_2SO_4$. Inset, photo of the $IrO_2$ anode. Scale bar, 5 mm. FIG. 4f provides a cost estimate for producing about 10 g/L (about 1 wt. %) $H_2O_2$ solution using different electrolytes, based on the condition that both electrodes are operated at about 20 mA/$cm^2$. The market price shown here is a 50th of the market price for about 50 wt. % $H_2O_2$.

FIG. 5a shows a schematic drawing of the $H_2O_2$ electrolyzer. FIG. 5b shows a front-view photo (the same view direction as the schematic). Scale bar, 1 cm. FIG. 5c shows a side-view photo (from the OER chamber side). Scale bar, 1 cm. FIG. 5d shows operation of the electrolyzer by controlling the working current and the electrolyte flow rate. An about 10 g/L $H_2O_2$ solution is produced at a total cost of about \$4.66/$m^3$, when the working current and the electrolyte flow rate are respectively kept at about 100 mA and about 5 mL/h.

FIG. 6a shows a schematic drawing of an organic wastewater treatment system, which addresses the two challenges facing comparative AOPs: (i) the production and (ii) the activation of $H_2O_2$. FIG. 6b shows teratogenicity studies in zebrafish embryos showing that the treatment system mitigates the teratogenicity of a synthetic polluted water, which contains a mixture of about 10 ppm triclosan (antiseptic), about 10 ppm 17α-ethinyl estradiol (estrogenic birth control medication) and about 10 ppm cefazolin sodium (antibiotic), without generating noticeable toxic byproducts. n=96 for each experimental condition. FIG. 6c shows the morphology of zebrafish larvae cultured in different media. Scale bars, 1 mm.

FIG. 7a shows element maps revealing a uniform distribution of C, N, and Cu in Cu—$C_3N_4$. No inhomogeneous reaction producing, for example, CuO or $Cu_2O$ is observed, in agreement with the HR-TEM images. FIG. 7b and FIG. 7c show EDS spectrum indicating the absence of any contaminant element.

FIG. 10a shows linear fitting of ln(C/C₀) vs. degradation time. C, concentration of RhB. C₀, initial concentration of RhB (about 10 μM). FIG. 10b shows a fitted reaction rate constant (k) for different catalysts. H₂O₂ denotes without catalyst.

FIG. 11a shows cyclic runs of RhB (about 10 μM) degradation by H₂O₂ (about 1 g/L) activated by Cu—C₃N₄ (about 1 g/L). FIG. 11b shows an XPS Cu 2p spectra showing that the ratio of Cu(II) to Cu(I) in Cu—C₃N₄ increased after ten cycles, indicating that the Cu(I)/Cu(II) redox is involved in the catalytic process. FIG. 11c shows that no Cu—Cu bond was detected in the fresh and used Cu—C₃N₄ based on analysis of the EXFAS spectra.

FIG. 12a shows an alteration is made of the Cu content in Cu—C₃N₄ by changing the mole ratio of Cu/C in the precursors and examination is made of its effect on catalytic activity using RhB degradation. The data shows that increasing Cu content can enhance the catalytic activity, while too much Cu can adversely affect the performance. About 1:20 is optimum. FIG. 12b shows an aberration-corrected HR-TEM image of Cu—C₃N₄ (Cu/C in precursors, about 1:10) showing the formation of CuO nanoparticles.

FIG. 14a shows a SEM image of the front (carbon) surface of the GDE showing the uniform loading of the O-SP catalyst. Scale bar, 50 μm. FIG. 14b shows a SEM image of the back (PE) surface of the GDE showing the porous openings. Scale bar, 10 μm. FIG. 14c shows LSV curves of a GDE supplied with pure O₂, a GDE supplied with atmospheric air, and a carbon paper electrode immersed in electrolyte. All the electrodes are loaded with the same amount of catalyst (about 0.5 mg/cm²). Electrolyte, about 0.1 M Na₂SO₄. FIG. 14d shows the selectivity of the GDE for 2e-ORR over 4e-ORR at different current density, with O₂ supplied in its pure state or in the form of air.

FIG. 15a shows a schematic of a modified H-type cell. WE, working electrode. CE, counter electrode. RE, reference electrode. The GDE is fixed on a side opening cuvette, with its front (carbon) surface exposed to electrolyte and its back (PE) surface exposed to air. FIG. 15b shows a photo of the GDE fixed on a side opening cuvette. Scale bar, 1 cm.

FIG. 17a shows a photo of the Fe₃O₄-carbon filter. Cross-sectional area, about 1 cm². Length, about 5 cm. Scale bar, 5 cm. FIG. 17b shows a SEM image of the filter media. Scale bar, 200 μm. Inset, magnified SEM image showing the Fe₃O₄-carbon catalyst coated on each carbon fiber. Scale bar, 5 μm. FIG. 17c shows an aberration-corrected HR-TEM image of the Fe₃O₄-carbon catalyst showing Fe₃O₄ nanoparticles embedded in amorphous carbon. Scale bar, 20 nm. FIG. 17d shows a fast Fourier transform of the HR-TEM image confirming the nanoparticles as Fe₃O₄. FIG. 17e shows H₂O₂ removal efficiency as a function of filtration time. Flow rate, about 3 mL/h. Inlet H₂O₂ concentration, about 1 g/L.

FIG. 18a shows a UV-PESA spectrum of Cu—C₃N₄. FIG. 18b shows a UV-vis DRS spectra of Cu—C₃N₄ and C₃N₄. b, FIG. 18c shows Tauc plots obtained by using the Kubelka-Munk method.

FIG. 19a shows dependence of the ζ potential of Cu—C₃N₄ on pH. FIG. 19b shows an energy diagram of the catalyst/solution interface. E, the absolute energy scale with respect to $E_{vac}$ (eV) (the energy of the electron at rest in vacuum just outside of the surface of Cu—C₃N₄). φ, the electrochemical potential scale with respect to $\varphi_{SHE}$ (V) (the potential of the standard hydrogen electrode). $E_{vac}^S$ the energy of the electron at rest in vacuum just outside of the surface of the solution. χ, electron affinity. $\varphi_H$, Helmholtz double layer potential. IHL, Inner Helmholtz layer. OHL, outer Helmholtz layer. In the scheme, the vertical direction indicates increasing electron energy. The arrow indicates the convention of sign for a given quantity. The arrow for A, joining levels B (base of the arrow) and C (tip of the arrow), means that the defined quantity is A=C−B.

DETAILED DESCRIPTION

Figure 1:
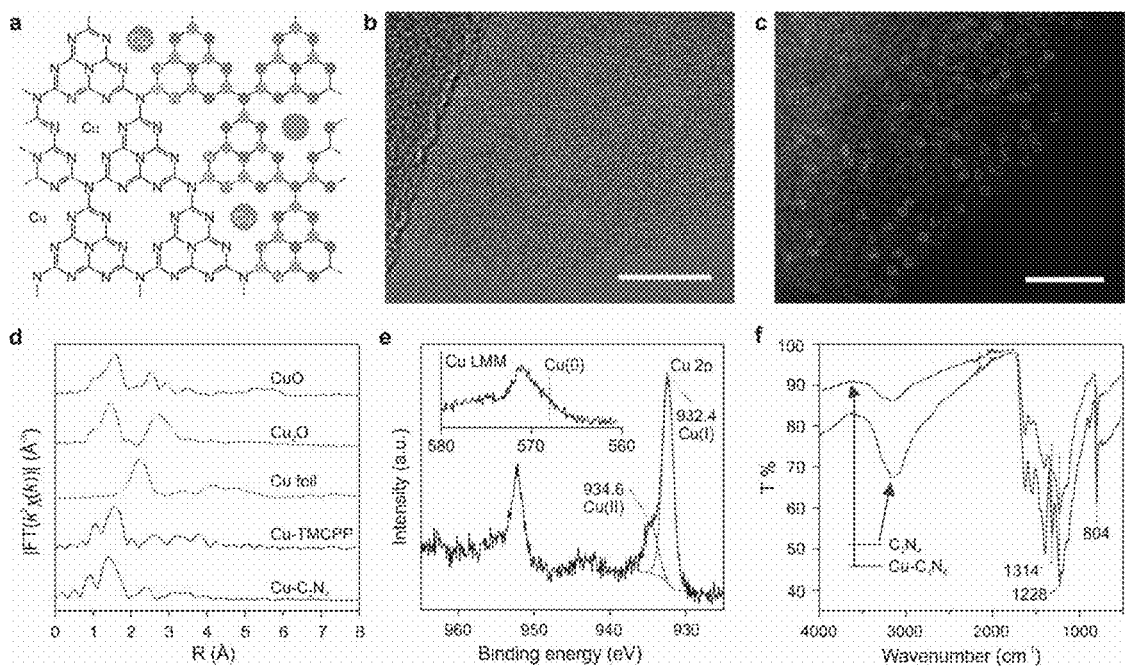
FIG. 1 shows an embodiment of the characterizations of Cu—$C_3N_4$.

The present disclosure includes embodiments directed to Fenton filters, methods of generating radicals from an oxidant, electrolyzers, methods of generating hydrogen peroxide, and water treatment systems.

First Aspect

In some embodiments, a Fenton filter includes a porous substrate and a catalyst coating the porous substrate, wherein the catalyst includes a matrix and individual or single metal atoms incorporated in the matrix.

In some embodiments, the matrix includes an organic material.

In some embodiments, the matrix includes heterocycles bonded to one another. In some embodiments, the heterocycles include carbon-nitrogen heterocycles. In some embodiments, the heterocycles are aromatic. In some embodiments, the heterocycles include heptazine units or moieties. In some embodiments, the matrix includes graphitic carbon nitride.

In some embodiments, the single metal atoms include single transition-metal atoms. In some embodiments, the single metal atoms include single copper atoms. In some embodiments, the single metal atoms have non-zero oxidation states. In some embodiments, the non-zero oxidation states are positive, namely n+, where n is 1, 2, 3, or greater.

In some embodiments, the single metal atoms are incorporated within coordination sites in the matrix. In some embodiments, the single metal atoms are incorporated through coordination bonds within the coordination sites. In some embodiments, the single metal atoms are spaced apart from one another in the matrix.

In some embodiments, a molar ratio of the single metal atoms to carbon atoms included in the matrix is in a range of about 1/50 or greater, about 1/40 or greater, about 1/30 or greater, or about 1/20 or greater, and up to about 1/10 or greater.

In some embodiments, the porous substrate is fibrous and includes fibers, and the fibers are coated with the catalyst.

In some embodiments, the porous substrate is carbon felt or carbon cloth.

Second Aspect

In some embodiments, a method of generating radicals from an oxidant includes providing the Fenton filter of any of the embodiments disclosed herein (e.g., of the first aspect), and passing a solution including the oxidant through the Fenton filter to generate radicals from the oxidant.

In some embodiments, the oxidant includes hydrogen peroxide. In some embodiments, the radicals include hydroxyl radicals.

Third Aspect

In some embodiments, an electrolyzer includes (1) a gas chamber, (2) an oxygen evolution reaction (OER) chamber fluidly connected to the gas chamber, (3) an oxygen reduction reaction (ORR) chamber disposed between the gas chamber and the OER chamber, (4) a gas diffusion electrode (as a cathode) disposed between the gas chamber and the ORR chamber, (5) a proton exchange membrane disposed between the ORR chamber and the OER chamber, (6) an anode disposed in the OER chamber, and (7) an electrical power source connected to the gas diffusion electrode and the anode.

In some embodiments, the gas diffusion electrode includes a porous current collector, a gas diffusion layer coating a first side of the porous current collector, and an ORR catalyst incorporated in the porous current collector. In some embodiments, the gas diffusion layer faces toward the gas chamber, and a second, opposite side of the porous current collector faces toward the ORR chamber. In some embodiments, the porous current collector is fibrous and includes fibers, and the ORR catalyst is incorporated in spaces between the fibers. In some embodiments, the porous current collector is carbon felt or carbon cloth. In some embodiments, the gas diffusion layer is a porous polymer layer. In some embodiments, the gas diffusion layer is a porous polyolefin layer. In some embodiments, a pore size (e.g., an average or median pore size) of the gas diffusion layer is smaller than a pore size (e.g., an average or median pore size) of the porous current collector. In some embodiments, the ORR catalyst includes oxidized carbon particles.

In some embodiments, the anode includes a current collector and an OER catalyst coating the current collector. In some embodiments, the current collector is a metallic mesh. In some embodiments, the OER catalyst includes a metal oxide.

Fourth Aspect

In some embodiments, a method of generating hydrogen peroxide includes providing the electrolyzer of any of the embodiments disclosed herein (e.g., of the third aspect), conveying air into the OER chamber to generate oxygen, conveying oxygen from the OER chamber to the gas chamber, and conveying an electrolyte through the ORR chamber to generate hydrogen peroxide resulting from reduction of oxygen from the gas chamber passing through the gas diffusion electrode.

Fifth Aspect

In some embodiments, a water treatment system includes the electrolyzer of any of the embodiments disclosed herein (e.g., of the third aspect), and/or the Fenton filter of any of the embodiments disclosed herein (e.g., of the first aspect) fluidly connected to and downstream from the electrolyzer.

In some embodiments, the water treatment system further includes an oxidant filter fluidly connected to and downstream from the Fenton filter. In some embodiments, the oxidant filter includes a porous substrate and a disproportionation catalyst coating the porous substrate. In some embodiments, the disproportionation catalyst includes a metal oxide. In some embodiments, the porous substrate is fibrous and includes fibers, and the fibers are coated with the disproportionation catalyst. In some embodiments, the porous substrate is carbon felt or carbon cloth.

EXAMPLES

This exemplary disclosure demonstrates that Cu single atoms incorporated in graphitic carbon nitride (Cu—$C_3N_4$) can catalytically activate $H_2O_2$ to generate ·OH and show robust stability within a filtration device. This exemplary disclosure also reports the design of an electrolysis reactor for on-site and decentralized generation of $H_2O_2$. Finally, a wastewater treatment system is presented that couples the single-atom Cu—$C_3N_4$ catalytic filter and the $H_2O_2$ electrolytic generator. The findings lay the groundwork for an improved wastewater treatment technology.

The first challenge facing AOPs is the efficient activation of the oxidant, such as $H_2O_2$. Ultraviolet (UV) light is used in comparative AOPs to cleave the O—O bond of $H_2O_2$ to generate ·OH, yet this process is highly energy-intensive, and the mercury inside UV lamps raises safety concerns. Therefore, finding a catalyst to activate $H_2O_2$ without energy input is desired for next-generation AOPs. Homogeneous catalysts, such as Fenton's reagent (reaction 1 and 2), suffer from drawbacks such as the criteria of low pH, the recyclability of $Fe^{2+}$, and the accumulation of iron-containing sludge. The heterogeneous Fenton reaction is a promising alternative (reaction 3 and 4). Activation of $H_2O_2$ can be performed through the one-electron redox cycle of exposed transition-metal atoms (Fe, Cu, Mn, and so forth) on various supports (magnetite, zeolites, activated carbon, and so forth). However, few of these catalysts exhibit good activity at pH 7, which is often attributed to three reasons: (i) the quenching of ·OH by adjacent transition-metal atoms (reaction 3 and 5), (ii) the disproportionation of $H_2O_2$ proceeding via a two-electron redox cycle (reaction 6 and 7), and (iii) the slow kinetics of reaction 4, retarding the full catalytic cycle. Single-atom catalysis lies at the frontier bridging homogeneous and heterogeneous catalysis. In the first part of this exemplary disclosure, demonstration is made that Cu single atoms incorporated in graphitic carbon nitride ($C_3N_4$) solve all the three aforementioned problems facing heterogeneous Fenton catalysts and show superb activity at pH 7. The degradation pathway and catalytic mechanism are also discussed. In addition, report is made of the design of a Fenton filter, which bypasses the redundancy of catalyst recovery after treatment.

$$Fe^{2+} + H_2O_2 \rightarrow Fe^{3+} + \cdot OH + OH^- \qquad (1)$$

$$Fe^{3+} + H_2O_2 \rightarrow Fe^{2+} + \cdot OOH + H^+ \qquad (2)$$

$$M_{surface}^{n+} + H_2O_2 \rightarrow M_{surface}^{(n+1)+} + \cdot OH + OH^- \qquad (3)$$

$$M_{surface}^{(n+1)+} + H_2O_2 \rightarrow M_{surface}^{n+} + \cdot OOH + H^+ \qquad (4)$$

$$M_{surface}^{n+} + \cdot OH \rightarrow M_{surface}^{(n+1)+} + OH^- \qquad (5)$$

$$M_{surface}^{n+} + H_2O_2 \rightarrow M_{surface}^{(n+2)+} + 2OH^- \qquad (6)$$

$$M_{surface}^{(n+2)+} + H_2O_2 \rightarrow M_{surface}^{n+} + O_2 + 2H^+ \qquad (7)$$

The second challenge facing AOPs is the efficient production of $H_2O_2$. The anthraquinone process involves complex infrastructure and is not feasible for small-scale operations. Besides, the hazards associated with the transportation and storage of $H_2O_2$ further hinder the implementation of AOPs in remote areas and isolated communities. A promising alternative route is the on-site generation of $H_2O_2$ via the two-electron reduction of $O_2$ (2e-ORR) (reaction 8). This process can be coupled with the oxygen evolution reaction (OER) (reaction 9) to produce $H_2O_2$ in an electrolysis device using electricity, water, and air (reaction 10). Substantial efforts have been invested in catalyst development and mechanistic studies for 2e-ORR, yet few device-level demonstrations have shown practical utility. In the second part of this exemplary disclosure, report is made of the design of an electrolysis device that just consumes air, electricity, and about 0.1 M $Na_2SO_4$ electrolyte to generate about 10 g/L $H_2O_2$ at a total cost of about \$4.66/m³. This device is based on: (i) a gas diffusion electrode (GDE) to provide sufficient three-phase catalytic interfaces, (ii) a three-chamber design for operation within a continuous flow reactor, (iii) a carbon-based material to catalyze 2e-ORR, (iv) anodically electrodeposited $IrO_2$ to catalyze OER, and (v) a choice of the electrolyte.

$$O_2 + 2e^- + 2H^+ \rightarrow H_2O_2 \quad E_{red} = 0.695 \ V \ vs \ RHE \quad (8)$$

$$2H_2O \rightarrow O_2 + 4H^+ + 4e^- \quad E_{red} = 1.229 \ V \ vs \ RHE \quad (9)$$

$$O_2 + 2H_2O \xrightarrow{0.534 \ V} 2H_2O_2 \quad (10)$$

Herein, by combining the Fenton filter and the $H_2O_2$ electrolyzer, presentation is made of an improved wastewater treatment system, which successfully tackles the two aforementioned challenges facing comparative AOPs. Further demonstration is made of a $Fe_3O_4$-carbon filter that can quench the residual $H_2O_2$ and render the effluent safe for discharge to the environment. Small-scale pilot studies demonstrate the feasibility of the whole system, and a zebrafish embryo teratogenicity experiment is carried out to corroborate that the system generates no noticeable toxic byproduct.

Single-Atom Catalyst and Design Considerations

Figure 7:
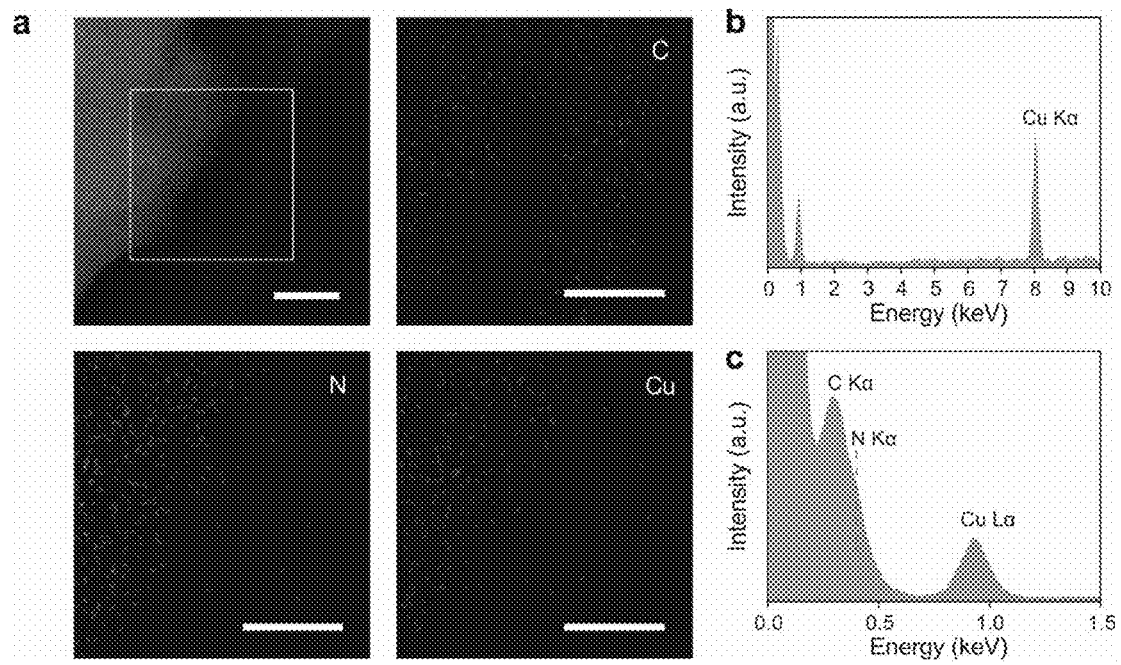
FIG. 7 shows an embodiment of the EDS of Cu—$C_3N_4$.
Figure 8:
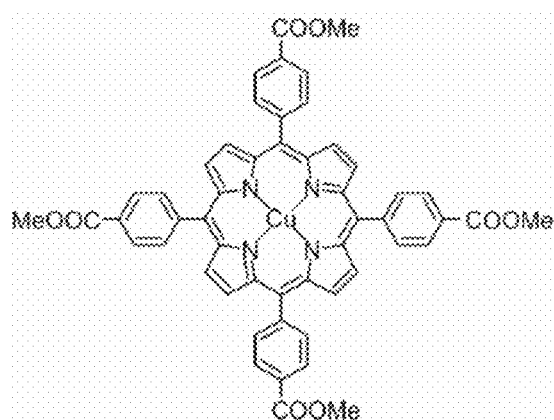
FIG. 8 shows the structural formula of Cu-TMCPP.

Concerning the heterogeneous Fenton reaction, the most desirable feature provided by single-atom catalysts is the uniform dispersion of actives sites in loose proximity to one another, which restrains the catalyst itself from quenching ·OH (reaction 5). Therefore, synthesis is made of Cu-incorporated $C_3N_4$ (Cu—$C_3N_4$) (FIG. 1a) via a streamlined one-pot method (see Methods), with $Cu(NO_3)_2$ and cyanamide (mole ratio of about 1:20) serving as the precursors. The Cu content in Cu—$C_3N_4$ can be readily tailored by altering the mole ratio of Cu/C in the precursors. The morphology of Cu—$C_3N_4$ was characterized by aberration-corrected high-resolution transmission electron microscopy (HR-TEM). As seen in FIG. 1b, the catalyst material is composed of a homogeneous amorphous structure without the presence of any noticeable Cu or CuO nanoparticles. Elemental mapping (FIG. 7) by energy-dispersive X-ray spectroscopy (EDS) indicates the existence and uniform concentration of Cu over the $C_3N_4$ matrix. A closer observation using aberration-corrected high-angle annular dark-field scanning transmission electron microscopy (HAADF-STEM) reveals the sole presence of isolated Cu atoms (circled out in FIG. 1c). Subsequently, use is made of Cu K-edge extended X-ray absorption fine structure spectroscopy (EXAFS) to confirm the coordination environment of Cu atoms (within coordination sites of the matrix). Unlike Cu, $Cu_2O$, and CuO, the Cu—$C_3N_4$ shows negligible Cu—Cu interaction based on analysis of their Fourier-transformed EXAFS spectra (FIG. 1d), which is desired for precluding the radical-quenching problem mentioned above. A further comparison between Cu—$C_3N_4$ and Cu-TMCPP (structural formula depicted in FIG. 8) on their EXAFS spectra shows that they share the same main peak centered at about 1.5 Å, corresponding to the Cu—N coordination.

Figure 9:
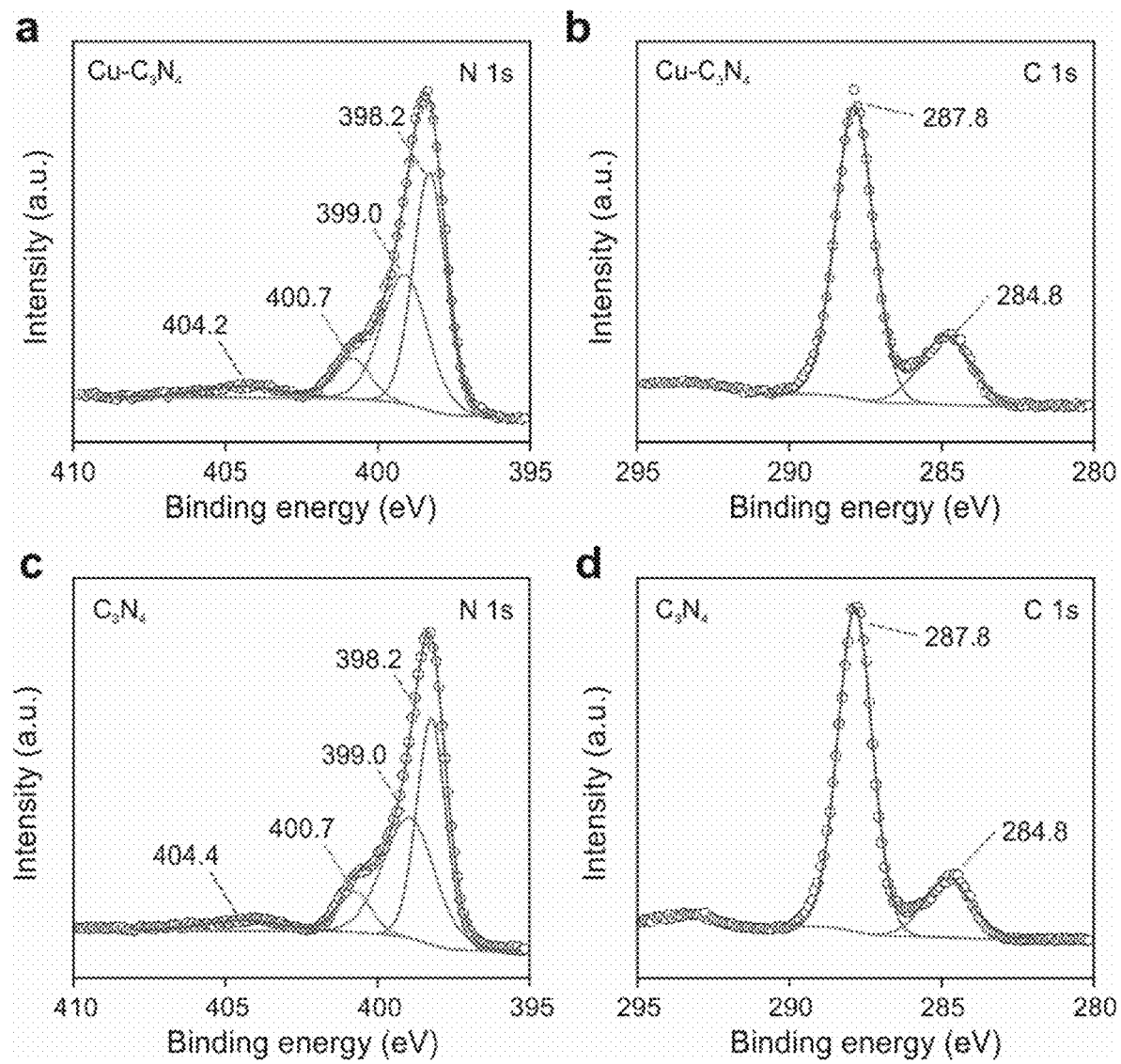
FIG. 9 shows an embodiment of the XPS N 1s and C 1s spectra of Cu—$C_3N_4$ and $C_3N_4$. For FIG. 9a and FIG. 9c, N 1s spectra, the peak at about 398.2 eV corresponds to the $sp^2$ hybridized aromatic N (C=N—C); the peak at about 399.0 eV is assigned to the tertiary N (N—(C)3 or H—N—(C)2); the peak at about 400.7 eV is attributed to the quaternary N in the aromatic cycles; and the peak at about 404.2 eV corresponds to the π-excitation. For FIG. 9b and FIG. 9d, C 1s spectra, the major peak at about 287.8 eV is identified as the $sp^2$ hybridized aromatic C (N—C=N); and the weaker peak at about 284.8 eV corresponds to the graphitic carbon. The N 1s and C 1s spectra of Cu—$C_3N_4$ show negligible difference from that of pure $C_3N_4$, indicating that the introduction of Cu in the precursor does not affect the formation of $C_3N_4$.

The reason to choose Cu and $C_3N_4$ as respectively the active centers (catalytic sites) and the hosting matrix is that this combination provides redox sites with single-electron capacity, which favors the radical mechanism (reaction 3) over the non-radical mechanism (reaction 6) during the decomposition of $H_2O_2$. In order to support this hypothesis, probing is made of the electronic properties of the Cu—$C_3N_4$ by X-ray photoelectron spectroscopy (XPS) (FIG. 1e). As observed, the Cu LMM Auger spectrum confirms the absence of metallic Cu(0), and the two peaks at about 932.4 eV and about 934.6 eV in the Cu 2p spectrum can be assigned to Cu(I) and Cu(II), respectively, indicating that the Cu single atoms can act as the desired redox sites with single-electron capacity. Further comparison is made of the N 1s and C 1s spectra of Cu—$C_3N_4$ with the counterparts of pure $C_3N_4$ (FIG. 9) and found negligible difference, which indicates that the introduction of Cu in the precursors does not affect the formation of $C_3N_4$. Fourier-transformed infrared spectroscopy (FTIR) was also introduced to ascertain the local structure (FIG. 1f). The breathing mode of heptazine units at about 804 cm⁻¹ and the stretching modes of C—N heterocycles in the about 1000-1600 cm⁻¹ region can be found in both the FTIR spectra of Cu—$C_3N_4$ and pure $C_3N_4$. Specifically, the band at about 1314 cm⁻¹, corresponding to the vibration of C=N—C (ring N), is less pronounced in the spectra of Cu—$C_3N_4$, while the band at about 1228 cm⁻¹, corresponding to the vibration of N—(C)₃ (tertiary N), shows similar intensity in the two spectra. This result supports the EXAFS spectra, indicating that $C_3N_4$ coordinates with Cu atoms through the ring N sites. In general, isolated Cu atoms with single-electron redox capacity were successfully incorporated into the N-coordinating cavities of $C_3N_4$.

Figure 2:
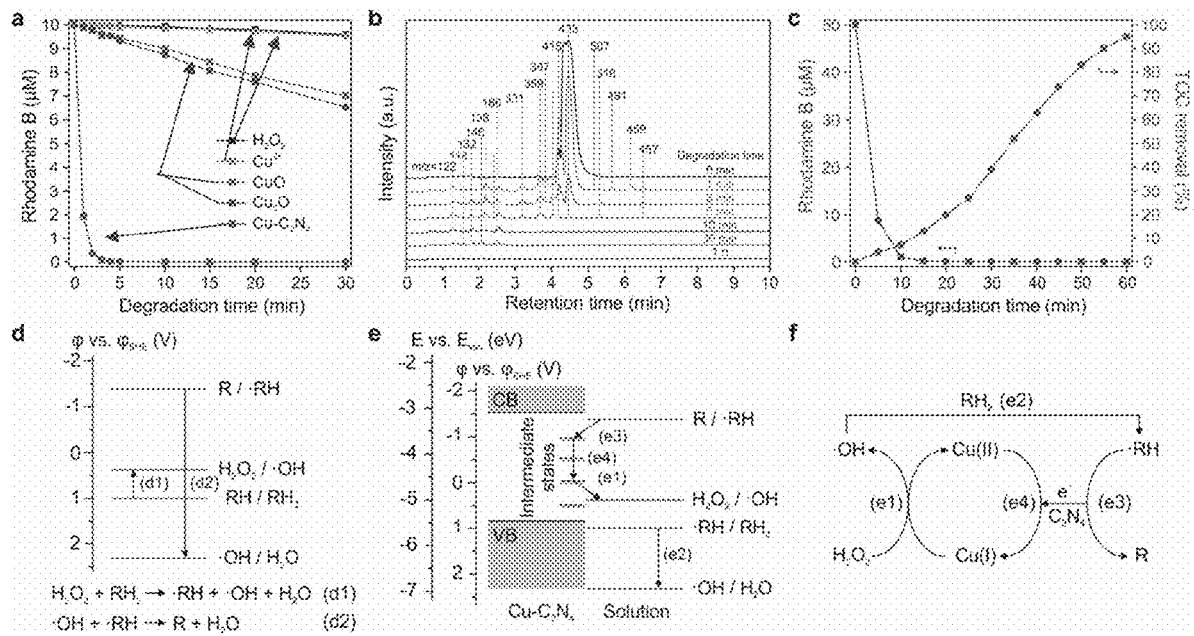
FIG. 2 shows an embodiment of $H_2O_2$ activation by Cu—$C_3N_4$.
Figure 10:
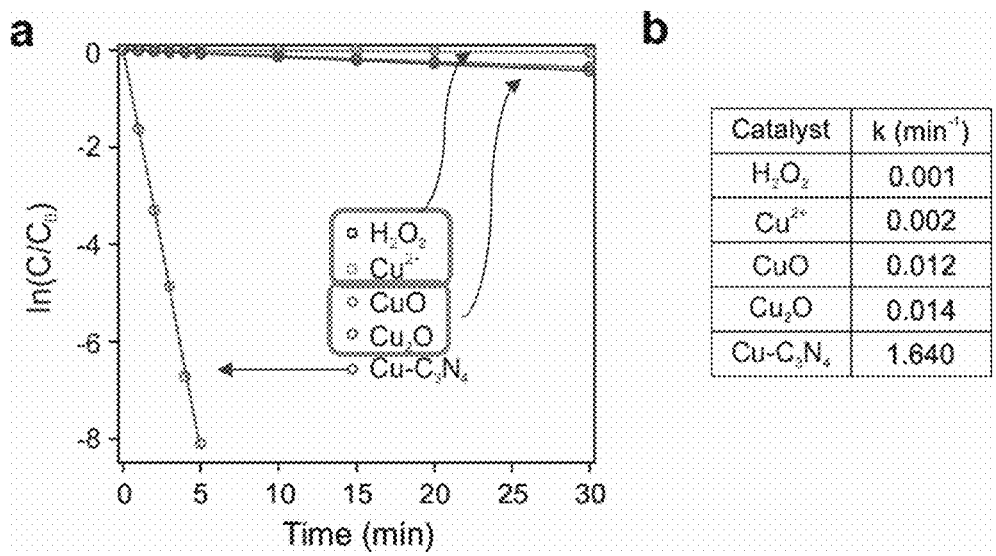
FIG. 10 shows an embodiment of pseudo-first-order kinetics of the RhB degradation.

To evaluate the activity of Cu—$C_3N_4$, use is made of the oxidative degradation of Rhodamine B (RhB) as a model reaction. Typically, about 1 g/L of prepared catalyst powder was added into about 10 ml of about 10 μM RhB aqueous solution at pH of about 7, with magnetic stirring. After establishing adsorption/desorption equilibrium (about 10 min), about 1 g/L of $H_2O_2$ was added, and the concentration of RhB was measured by high-performance liquid chromatography (HPLC) at given time intervals. All the experiments were conducted under dark conditions to eliminate the effect of photocatalysis. As shown in FIG. 2a, the degradation of RhB in the Cu—$C_3N_4$/$H_2O_2$ suspension reached about 99.97% in about 5 min, while less than about 40% RhB was removed when using comparative Cu-containing catalysts such as $Cu_2O$ or CuO. In addition, dissolved $Cu^{2+}$ showed negligible homogeneous catalytic activity at pH of about 7, indicating the synergistic effect of Cu single atoms and their coordination environment. All the degradation curves were fitted to the pseudo-first-order kinetics model (FIG. 10). The rate constant for Cu—$C_3N_4$ catalyzed RhB degradation was about 1.64 min⁻¹, which is two orders of magnitude higher than those for $Cu_2O$ or CuO, and three orders of magnitude higher than without catalyst.

Figure 11:
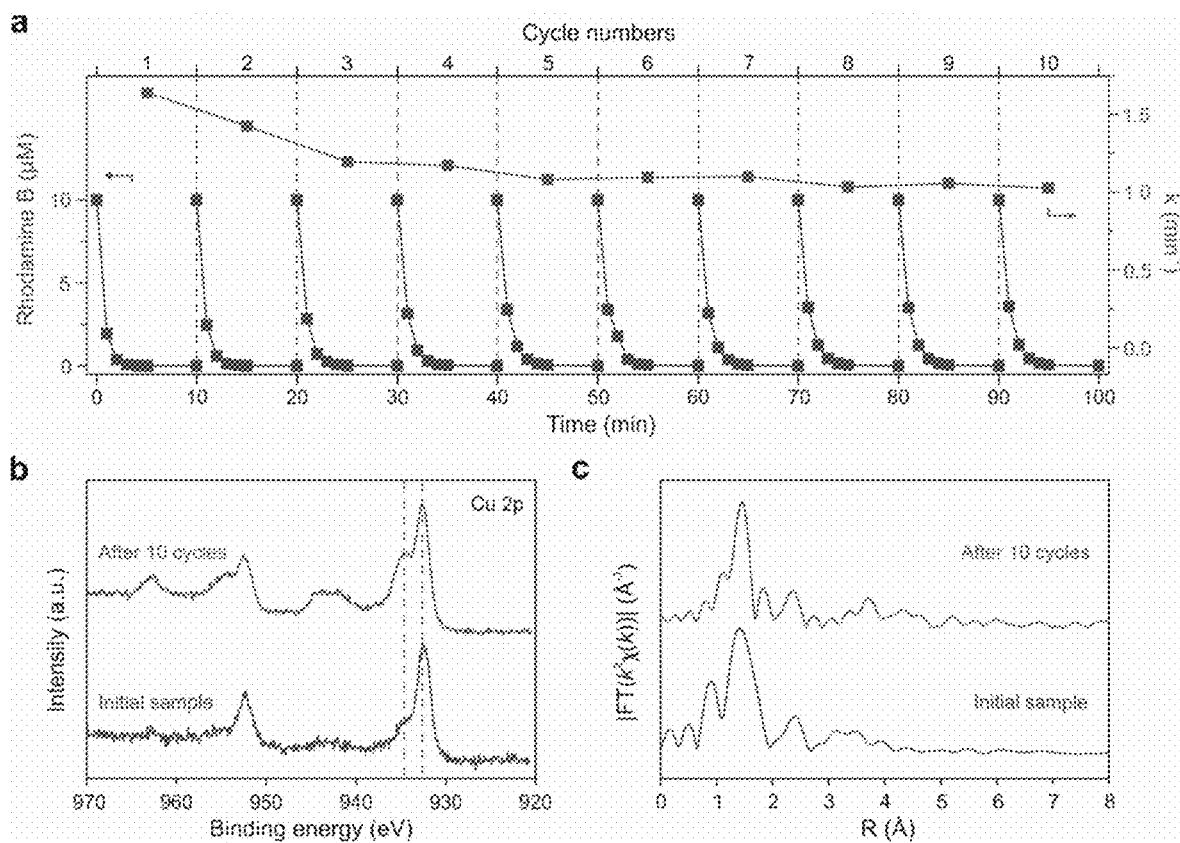
FIG. 11 shows an embodiment of a stability test of Cu—C₃N₄.
Figure 12:
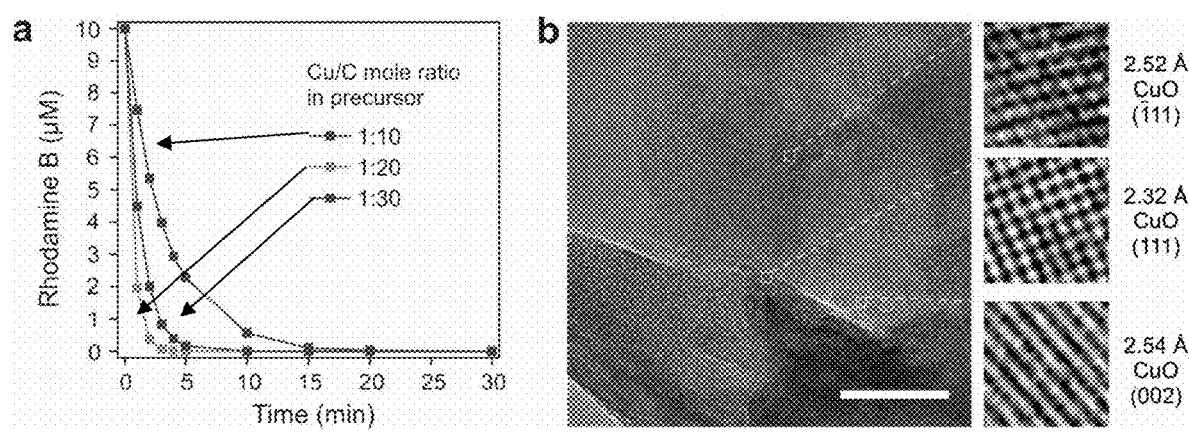
FIG. 12 shows an embodiment of the effect of Cu content on catalytic performance.

To highlight the exceptional stability of Cu—$C_3N_4$, the RhB degradation tests were repeated for ten cycles (FIG. 11a). Its pseudo-first-order reaction rate decreased from about 1.64 min⁻¹ to about 1.08 min⁻¹ over the first five cycles but stabilized thereafter. XPS analysis (FIG. 11b) revealed that the relative ratio of Cu(I)/Cu(II) in the used catalyst differed from that in fresh Cu—$C_3N_4$, which supports the hypothesis that the Cu(I)/Cu(II) redox was involved in the catalytic process. Comparison of EXAFS spectra (FIG. 11c) between used and fresh catalysts confirms the preservation of the single-atomic dispersion after cycles of reaction. Further insights into the performance were obtained by assessing the influence of the Cu content in Cu—$C_3N_4$. As shown in FIG. 12a, reducing the Cu content reduces the activity, which indicates that Cu is the active site. On the other hand, excessive Cu in the precursor adversely affects the catalyst's performance due to the formation of CuO nanoparticles (FIG. 12b). This observation supports the catalyst design considerations that isolated single atoms are superior to metal oxide nanoparticles for activating $H_2O_2$ to generate ·OH.

Degradation Products and Catalytic Mechanism

Figure 13:
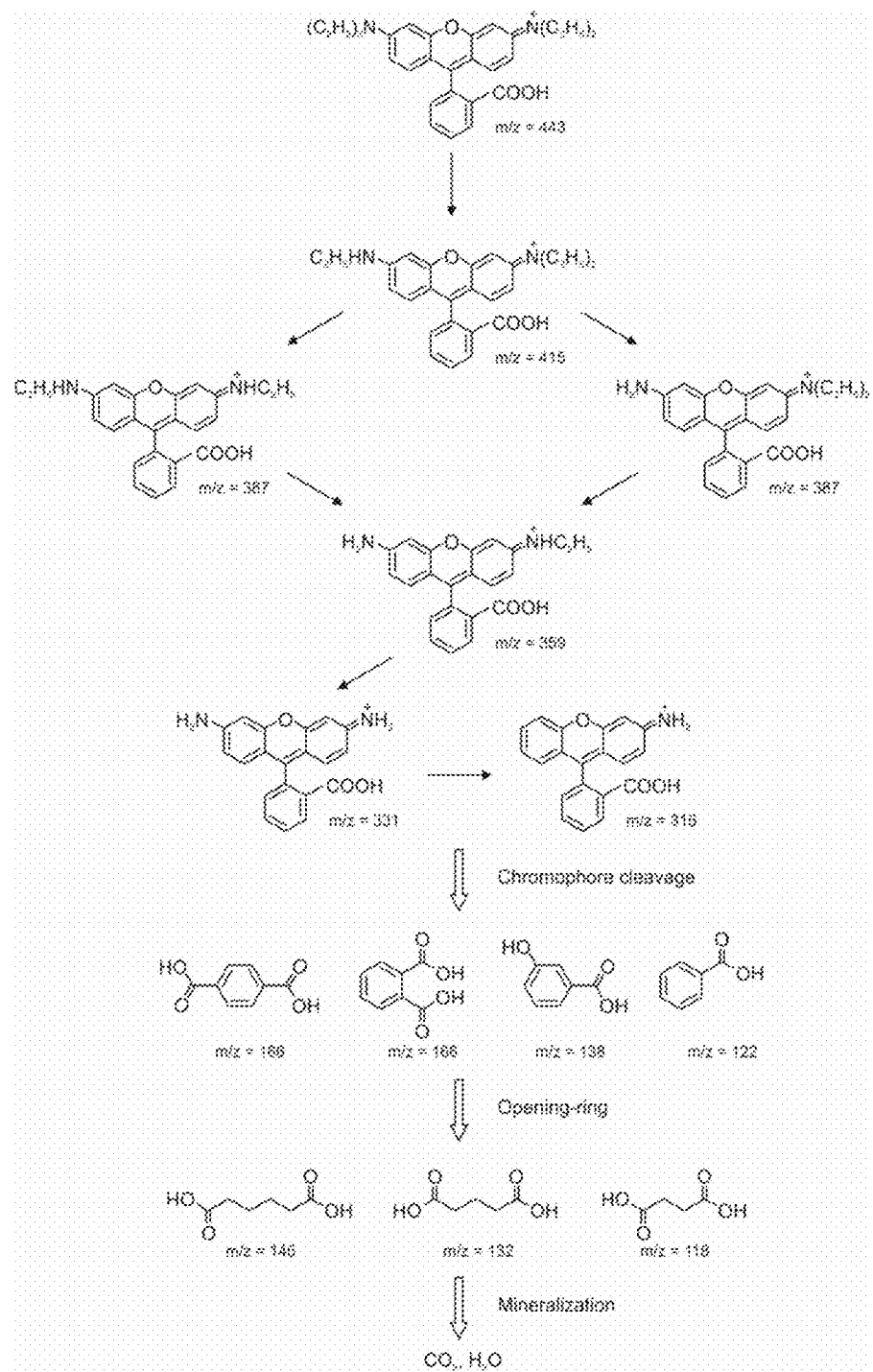
FIG. 13 shows an embodiment of a probable pathway for the degradation of RhB.

To identify the degradation products of RhB, application is made of liquid chromatography-mass spectrometry (LC-MS). FIG. 2b presents the chromatograms of an about 10 μM RhB solution after different treatment times. The significant peaks are labeled with the corresponding m/z values measured by mass spectrometry. For example, the peak with m/z=about 443 at retention time of about 4.4 min belongs to RhB, which decayed with increasing treatment time and finally disappeared after about 5 min. This observation is consistent with the kinetics study by HPLC. A probable degradation pathway (FIG. 13) is proposed based on the analysis of other major peaks in the LC-MS chromatograms. The m/z values of the peaks between retention time of about 3 min and about 5 min (m/z=about 433, about 415, about 387, about 359, and about 331) differed exactly by 28 units in sequence, which represents the sequential removal of the N-ethyl groups of RhB. The disappearance of these peaks after about 10 min of treatment indicates the successful destruction of the conjugated structure. Small aromatic acids (m/z=about 166, about 138, and about 122) were hence produced, and were further oxidized to linear dicarboxylic acids (m/z=about 146, about 132, and about 118) through ring-opening reactions. All the peaks disappeared after about 1 h of degradation, indicating that all the intermediate products were mineralized to $CO_2$.

To further confirm the degree of mineralization, measurement is made of the removal of total organic carbon (TOC) during the degradation. Due to TOC detection limit (about 0.1 ppm), increase is made of the initial RhB concentration from about 10 μM to about 50 μM, with the concentrations of Cu—$C_3N_4$ and $H_2O_2$ still kept at about 1 g/L. As shown in FIG. 2c, about 73% of TOC remained after about 25 min when substantially all the RhB had been completely degraded. Then, the removal rate of TOC gradually increased, and a mineralization degree of about 95% was reached after about 1 h. The increasing TOC removal rate agrees with the proposed degradation pathway, indicating that the mineralization undergoes two different stages: (i) scission of the RhB molecules, and (ii) subsequent oxidation of the fragments.

In order to explain the high catalytic activity of Cu—$C_3N_4$, comparison is made of its band structure with the redox potentials of reactive species in solution. Before that, first explanation is made of why the two-electron oxidation of an organic molecule $RH_2$ by $H_2O_2$ (reaction 11) is usually slow or cannot readily happen in the absence of a catalyst, even though such reactions have negative Gibbs free energy changes (ΔG). The oxidation of $RH_2$ to R actually involves two distinct one-electron oxidation steps (reaction 12 and 13), with a short-lived organic radical ·R as the intermediate compound. Similarly, the reduction of $H_2O_2$ to $H_2O$ also proceeds in two one-electron steps (reaction 14 and 15). Therefore, the ΔG of the potential-determining step, being in most cases the first one-electron transfer (reaction 12 coupled with reaction 14), is more indicative of the fate of $RH_2$ than the ΔG of the overall process (reaction 11). Such analysis can be visualized using an energy diagram as shown in FIG. 2d. In the schematic, the upward direction of the y-axis indicates a lower redox potential (φ) and higher electron energy (E), since electrons have negative charge. The horizontal lines represent the redox couples of interests. An arrow connecting two redox couples denotes a redox reaction, with its length and direction representing respectively the absolute value and sign of the ΔG (e.g., a downward arrow indicates a thermodynamically favorable electron transfer). Specifically, arrow d1, coupling reaction 12 and reaction 14, represents the first step of reaction 11, while arrow d2, coupling reaction 13 and reaction 15, represents the second step of reaction 11. All in all, FIG. 2d illustrates that, without catalyst, the two-electron oxidation of $RH_2$ to R by $H_2O_2$ is hindered by the first step.

$$RH_2+H_2O_2 \rightarrow R+2H_2O \qquad (11)$$

$$RH_2 \rightarrow \cdot RH+H^++e^- \qquad (12)$$

$$\cdot RH \rightarrow R+H^++e^- \qquad (13)$$

$$H_2O_2+e^- \rightarrow \cdot OH+OH^- \qquad (14)$$

$$\cdot OH+e^- \rightarrow OH^- \qquad (15)$$

FIGS. 2e and f show respectively the energy diagram of the catalyst/solution interface and a possible catalytic pathway, which is explained in four steps (e1-e4). In step I, a Cu(I) site on Cu—$C_3N_4$ reduces a $H_2O_2$ by one electron, forming a free ·OH and a Cu(II) site. In step II, the ·OH diffuses away and oxidizes an organic molecule $RH_2$ to an organic radical ·RH. In step III, the highly reducing ·RH gives one electron to the catalyst to become the oxidized product R. The π-π interaction between the aromatic structure in ·RH and the C—N heterocycles in $C_3N_4$ may facilitate this process. In step IV, the electron diffuses within the semiconducting catalyst to a Cu(II) site, reducing it back to Cu(I). In each cycle, one $H_2O_2$ molecule is consumed to oxidize the organic compound by two electrons. As the cycle repeats, the organic compound is finally mineralized to $CO_2$. Due to the non-selective nature of OH, there are many side reactions. For example, the RH can be oxidized by ·OH rather than give its electron to the catalyst, and ·OH can be quenched by $H_2O_2$ or ·OH itself. Therefore, the catalytic pathway proposed here is not necessarily the sole mechanism. Nevertheless, it can happen together with other catalytic pathways, such as the one shown in reaction 3 and 4, and catalyze the oxidation reactions complementarily. Discussions and experimental data on the determination of the band edge positions of Cu—$C_3N_4$ are provided in Supplementary Discussion.

A Fenton Filter

Figure 3:
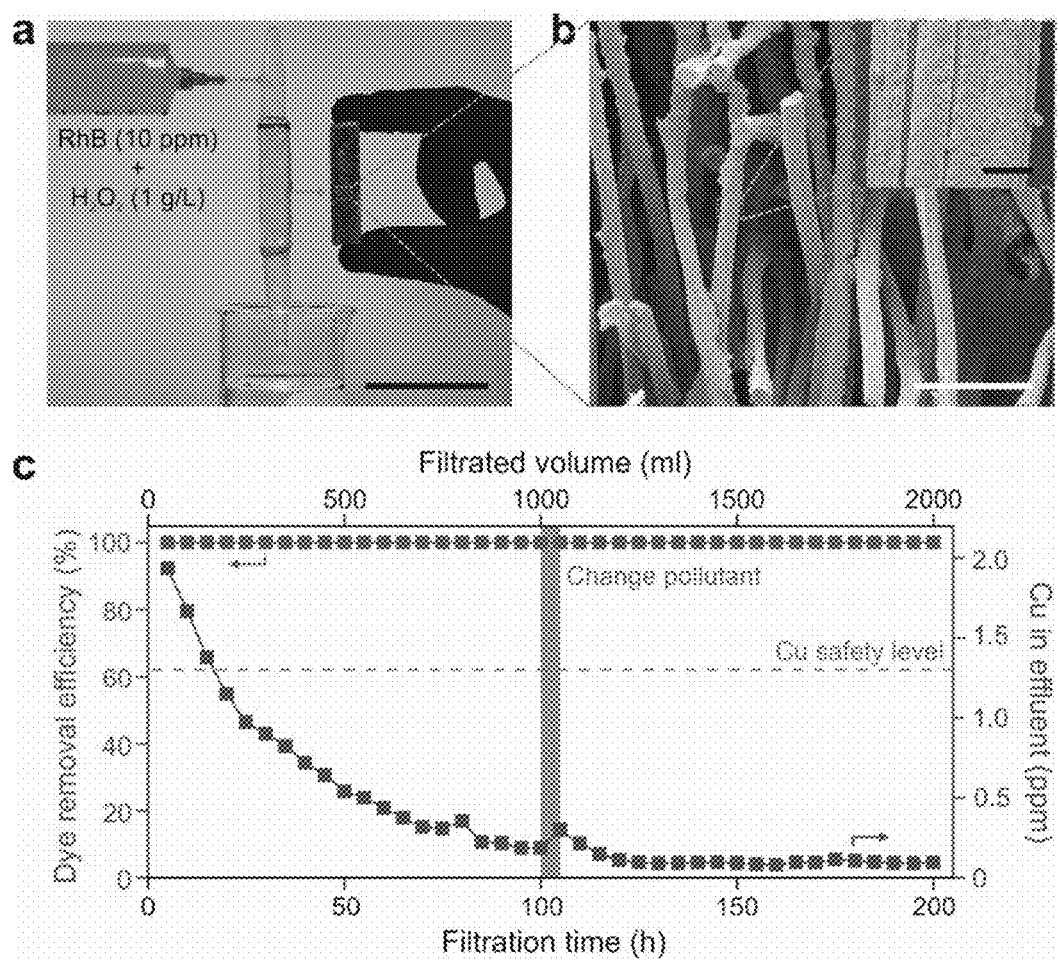
FIG. 3 shows an embodiment of a Fenton filter.

The high catalytic activity of Cu—$C_3N_4$ leads to further exploration of its scope at device level. FIG. 3a shows the photo of a demonstration Fenton filter. Specifically, a square tube of cross-sectional area of about 1 $cm^2$ and length of about 5 cm was filled with carbon felt, which is a porous structure composed of carbon fibers. Cu—$C_3N_4$ was coated on the surface of each carbon fiber (see Methods), as shown in the scanning electron microscopy (SEM) image in FIG. 3b. A mixed solution of about 10 ppm RhB and about 1 g/L $H_2O_2$ was passed through the Fenton filter at a flow rate of about 10 mL/h. The transparent color in the effluent indicates successful destruction of the conjugated structure of RhB. Further application is made of HPLC to confirm the pollutant concentration in the effluent. As shown in FIG. 3c, the Fenton filter showed superb stability, maintaining 100% dye removal efficiency after about 200 h of operation (about 2 L of wastewater was filtered). At about 100 h, change is made of the pollutant from about 10 ppm RhB to about 10 ppm Methylene Blue (MB) to demonstrate the versatility of our Fenton filter for different pollutant molecules.

Another advantage of using $Cu-C_3N_4$ lies in its leaching resistance. Inductively coupled plasma mass spectrometry (ICP-MS) was carried out to measure the concentration of leached Cu in the effluent. As illustrated by the blue curve in FIG. 3c, the Cu concentration in the effluent finally reached a steady state of about 0.1 ppm, which is well below the Maximum Contaminant Level Goal for drinking water (1.3 ppm) set by the U. S. Environmental Protection Agency (EPA). The relatively high concentration of Cu in the initial effluent can be attributed to the unreacted precursors. Therefore, washing the filter with water after synthesis can help to reduce this leaching.

$H_2O_2$ Electrolyzer: Cathode, Anode and Electrolyte

Figure 4:
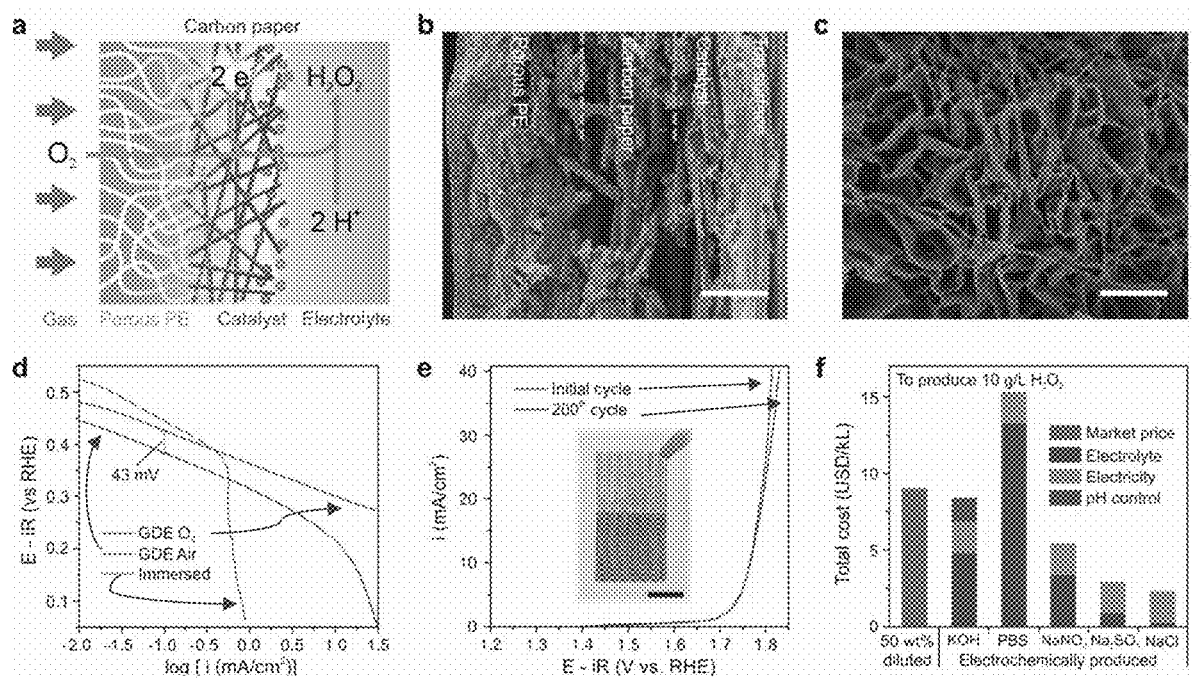
FIG. 4 shows an embodiment of an $H_2O_2$ electrolyzer: electrodes and electrolyte.
Figure 14:
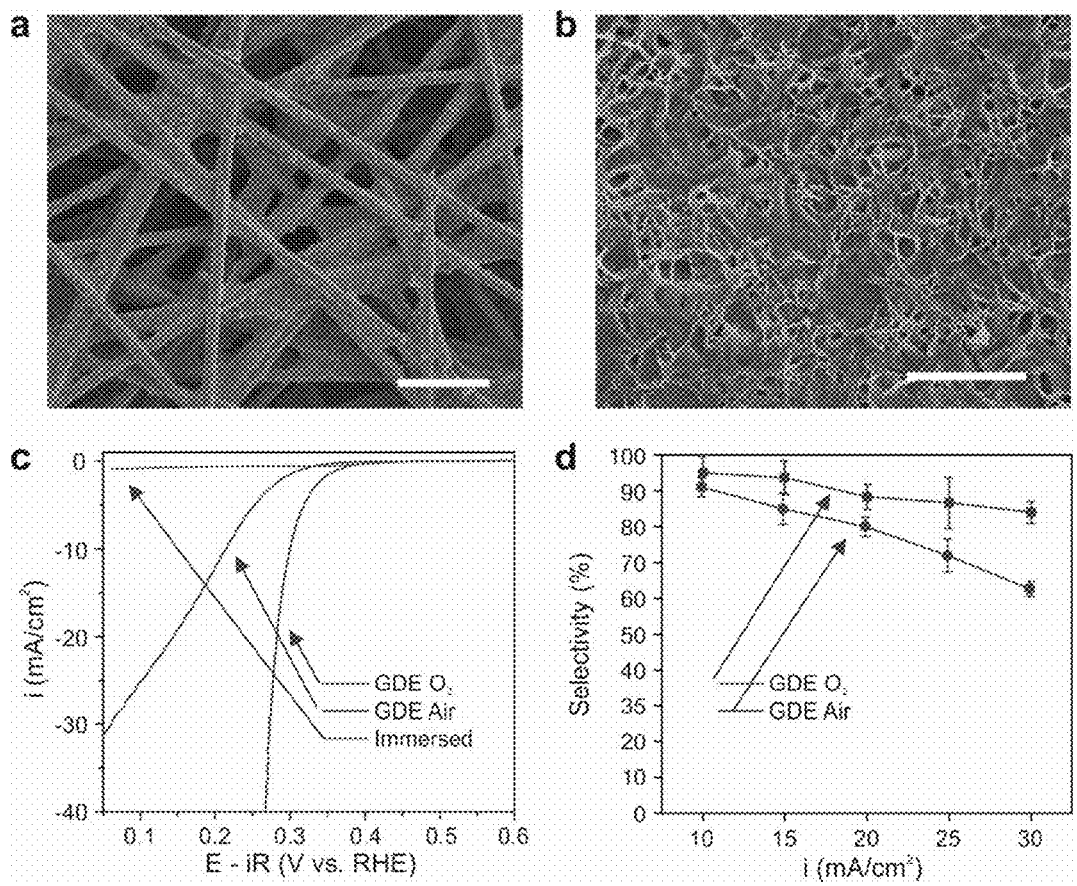
FIG. 14 shows an embodiment of additional characterizations of the GDE.

A major challenge for developing a $H_2O_2$ electrolyzer falls on the cathode for 2e-ORR. Because the ratio of $O_2$ to $H_2O$ molecules in an aqueous solution under atmosphere is about 1:200,000, a comparative cathode immersed in electrolyte can readily reach the diffusion limit and build up a high concentration overpotential. The schematic in FIG. 4a shows a proposed design of a gas diffusion electrode (GDE) for solving this problem by directly delivering the gas reactant to the catalyst surface. Fabrication is made of the GDE by mixing melted polyethylene (PE) and paraffin oil, then melt-pressing the composite mixture with a carbon paper, and finally extracting out the paraffin oil with methylene chloride. Oxidized Super P™ carbon black (O-SP) was used as the catalyst and drop-casted on the carbon paper side with a loading of about 0.5 $mg/cm^2$. In this configuration, the carbon paper acts as the current collector, and the porous PE functions as the hydrophobic gas diffusion layer. $O_2$ is supplied from the porous PE side and reacts at the gas-catalyst-electrolyte interface. The cross-sectional SEM image in FIG. 4b shows that the GDE has a hierarchical structure. The larger pores (about 50 μm) in the carbon paper are loaded with catalyst and facilitate mass transport in the liquid phase, while the smaller pores (about 2 μm) in porous PE (FIG. 4c) provide the gas diffusion pathway and prevent flooding. SEM images of the front (carbon) and back (PE) surfaces of the GDE are shown in FIGS. 14a and 14b.

Figure 15:
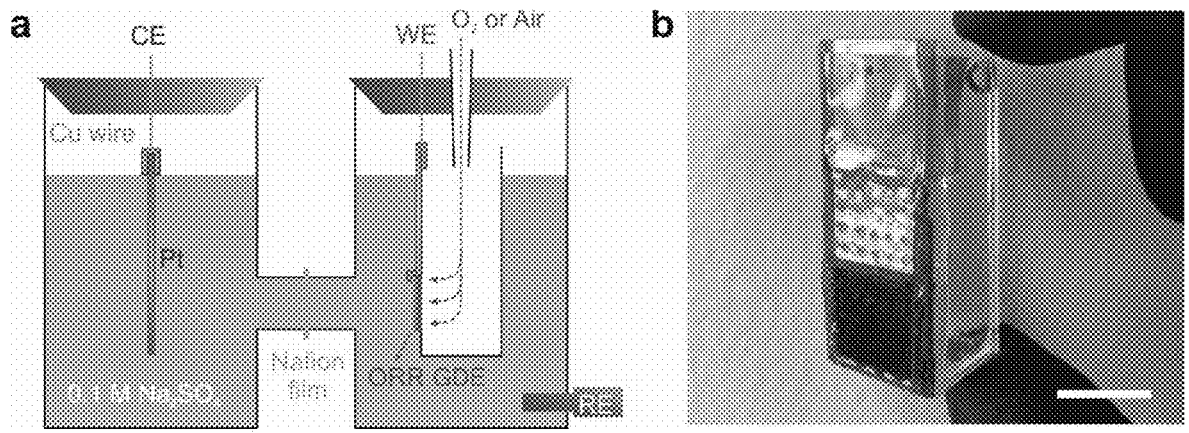
FIG. 15 shows an embodiment of an electrochemical cell for testing the GDE.

The performance of the GDE was characterized using a three-electrode configuration in a modified H-type cell (FIG. 15). Comparison is made of the GDE with an immersed carbon paper electrode (loaded with the same amount of catalyst) using Tafel plots (FIG. 4d), which are converted from the linear sweep voltammetry (LSV) data shown in FIG. 14c. For the immersed electrode with pure $O_2$ directly bubbled into the electrolyte, the Tafel plot drops from linearity at about 0.3 $mA/cm^2$, indicating the depletion of $O_2$ adjacent to the electrode. In contrast, for the GDE with pure $O_2$ supplied from the porous PE side, the Tafel plot remains linear up to about 30 $mA/cm^2$, corroborating the sufficient delivery of $O_2$ to the catalyst. Further substitution is made of air for pure $O_2$ to determine whether the GDE can operate without pure $O_2$ supply. Although the Tafel plot deviates from linearity at high current density, about 30 $mA/cm^2$ is still accessible at a reasonable overpotential. The overall potential shift of about 43 mV marked in FIG. 4d is due to the lower partial pressure of $O_2$ in air, which is expected according to the Nernst equation. Another important attribute for the cathode is the 2e-ORR selectivity relative to the four-electron reduction of $O_2$ to $H_2O$. As shown in FIG. 14d, the GDE has a high 2e-ORR selectivity no matter whether $O_2$ is supplied in its pure state or in the form of air.

Figure 16:
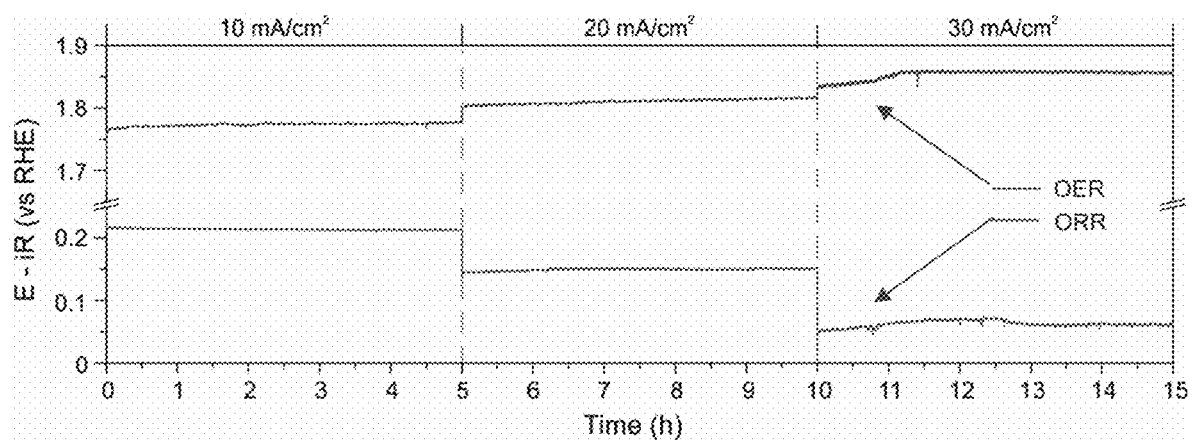
FIG. 16 shows an embodiment of a stability test of the GDE (ORR) and the IrO₂ electrode (OER). Chronopotentiometry tests of the two electrodes at about 10, about 20, and about 30 mA/cm² successively for 15 hours.

In addition to the cathode design, the anode should also be active and stable for OER. Here, fabrication is made of the anode by anodically electrodepositing $IrO_2$ on a titanium screen mesh in an oxalate-based deposition solution. The inset of FIG. 4e shows a photo of the anode. The black color of its lower part indicates the $IrO_2$ coating. The OER activity of the anode is confirmed by the LSV curve as shown in FIG. 4e. Moreover, the LSV curve after 200 cycles of continuous cyclic voltammetry (CV) scanning shows negligible difference from the initial one. To further confirm the stability of the cathode and anode, chronopotentiometry tests are conducted at about 10, about 20, and about 30 $mA/cm^2$ successively (FIG. 16). Both electrodes were very stable and showed no noticeable performance decay after about 15 hours of operation.

As stated above, the targeted $H_2O_2$ concentration in the mixed solution flowing through the Fenton filter is about 1 g/L. Considering that a ten-fold dilution is reasonable when mixing the electrolytically-produced $H_2O_2$ solution into the contaminated water, the electrolyzer has to generate $H_2O_2$ at a concentration of about 10 g/L. According to the potential of both electrodes at about 20 $mA/cm^2$ and the selectivity of the cathode, an initial estimate of the electricity cost is: about $2.03/m^3$. This estimation is based on the condition that the cathode is supplied by air. Compared with the market price of about 10 g/L $H_2O_2$ (about $9.00/m^3$, which is a 50th of the market price of 50 wt. % $H_2O_2$), this electricity cost is very promising. However, a significant additional cost comes from the electrolyte, which is a key component of an electrolyzer, yet is often neglected. In order to have a sufficient ionic conductivity, an about 0.1 M electrolyte solution was used (e.g., to produce about 1 $m^3$ of about 10 g/L $H_2O_2$ solution would involve about 100 moles (about 10 kg) of the electrolyte salt). FIG. 4f summarizes the total cost of producing an about 10 g/L $H_2O_2$ solution using different electrolytes. Although alkaline electrolyte provides a more stable condition for both OER and 2e-ORR, the cost of KOH and pH control indicated the desire to sacrifice the activity of the catalyst for the overall cost efficiency. As for pH-neutral electrolytes, phosphate-buffered saline (PBS) is too expensive, NaCl can be oxidized to chlorine at the anode, and $NaNO_3$ is a concern for discharge to the environment.

Therefore, selection is made of about 0.1 M $Na_2SO_4$ as the electrolyte, with an estimated total cost of about $2.93/m^3$.

$H_2O_2$ Electrolyzer: Device Design and Performance

Figure 5:
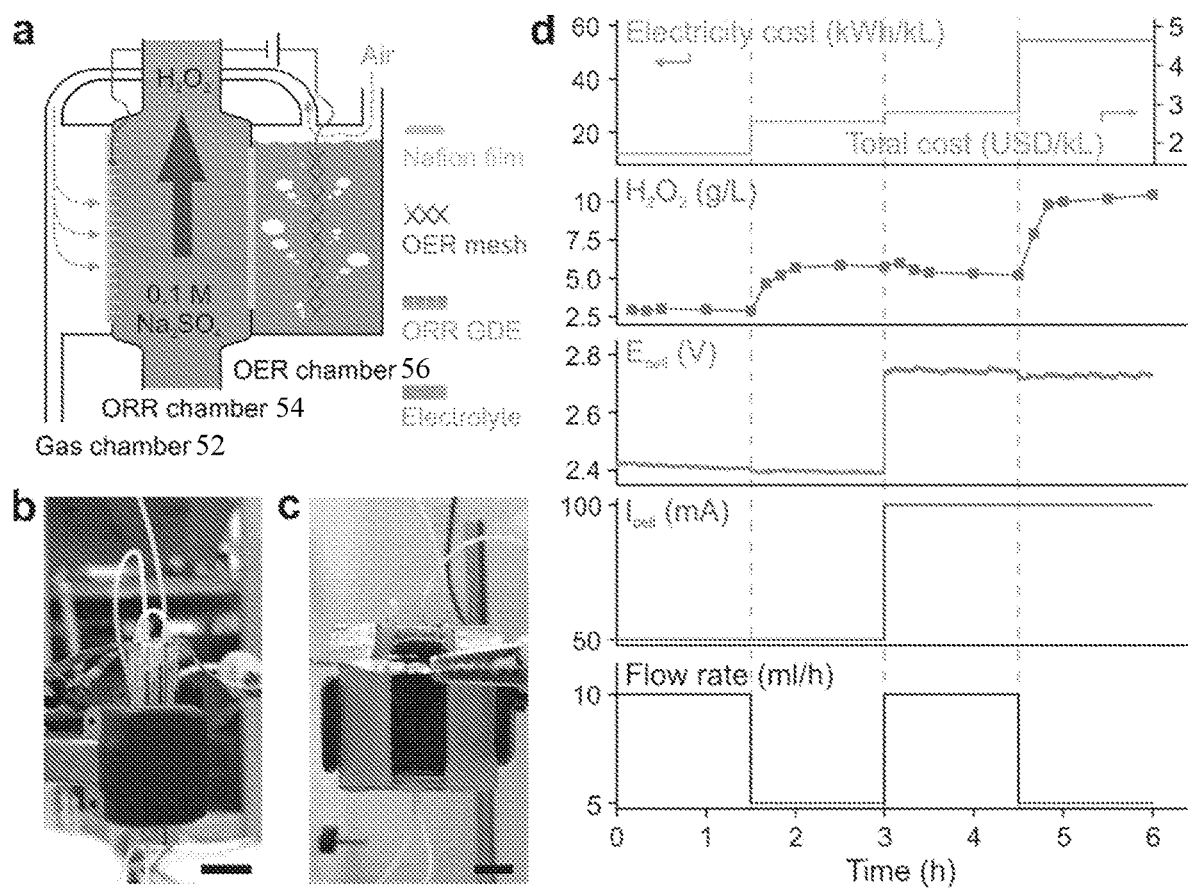
FIG. 5 shows an embodiment of an $H_2O_2$ electrolyzer: device design and performance.

FIG. 5a shows a schematic of a three-chamber design of a proposed $H_2O_2$ electrolyzer. An $IrO_2$-coated titanium mesh is immersed in the electrolyte in the OER chamber 56 as the anode. The OER chamber is separated from the ORR chamber by a proton exchange membrane (here, a film of a sulfonated tetrafluoroethylene based fluoropolymer-copolymer available as a Nafion™ film), which allows proton migration and obstructs $H_2O_2$ diffusion. A GDE seals the other side of the ORR chamber 54, separating it from the gas chamber 52. A gas tube connects the tops of the OER chamber 56 and the gas chamber 52. Atmospheric air is blown into the OER chamber 56, carrying out the generated oxygen, and then flows through the gas chamber 52. $O_2$ diffuses through the GDE as stated above (FIG. 4a), and gets reduced to $H_2O_2$. An about 0.1 M $Na_2SO_4$ electrolyte flows through the ORR chamber 54 and carries out the produced $H_2O_2$.

FIGS. 5b and c provide the front-view (the same view direction as the schematic) and side-view (from the OER chamber side) photos of the $H_2O_2$ electrolyzer, respectively. The cathode and the anode are both about 1.5 cm×about 3 cm. The air flow was kept at about 10 mL/min. As shown in FIG. 5d, operation is made of the electrolyzer by controlling the working current and the electrolyte flow rate. The steady potential confirms the stable operation of the electrolyzer. An about 10 g/L $H_2O_2$ solution was produced when the working current and the electrolyte flow rate were kept at about 100 mA and about 5 mL/h, respectively. The total cost (the electricity cost plus the electrolyte cost) for producing such about 10 g/L $H_2O_2$ solution is about \$4.66/m$^3$, which is higher than the previous estimate, because of the impedance loss and the self-decomposition of $H_2O_2$. Nevertheless, this value is still much lower than the market price, and on-site generation further eliminates the cost associated with the transportation and storage of $H_2O_2$.

An Organic Wastewater Treatment System

Figure 6:
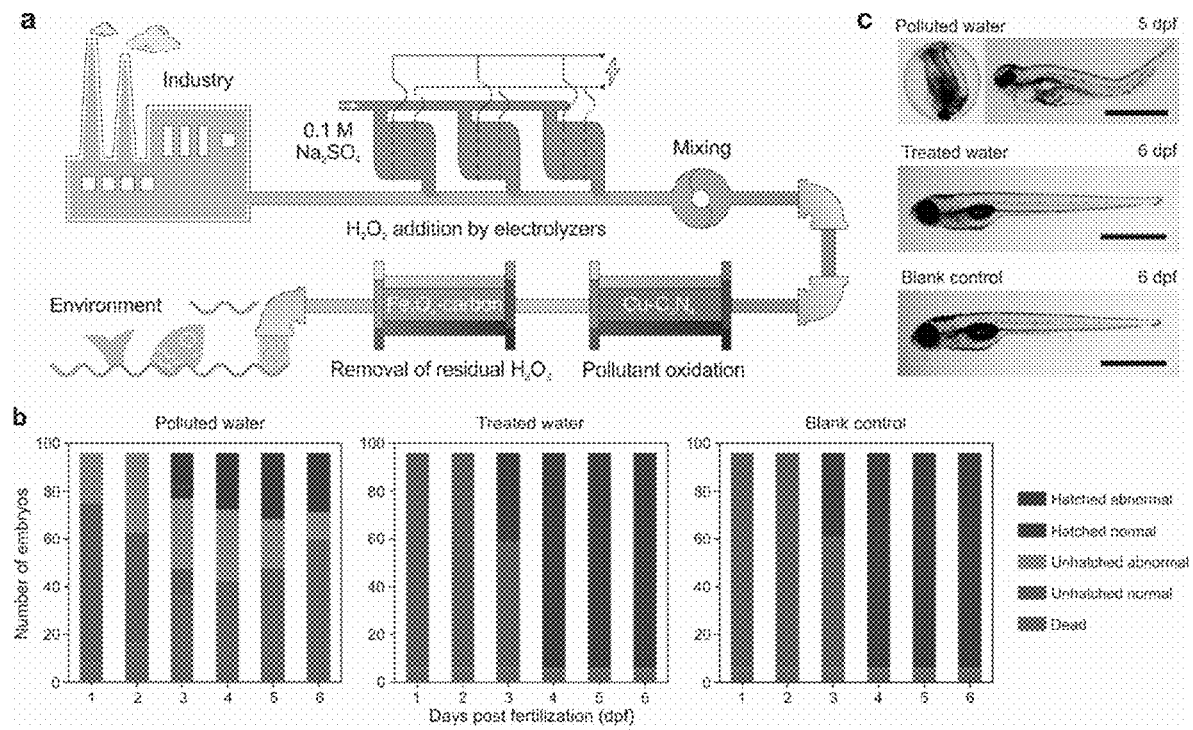
FIG. 6 shows an embodiment of a wastewater treatment system coupling the $H_2O_2$ electrolyzer and the Fenton filter.
Figure 17:
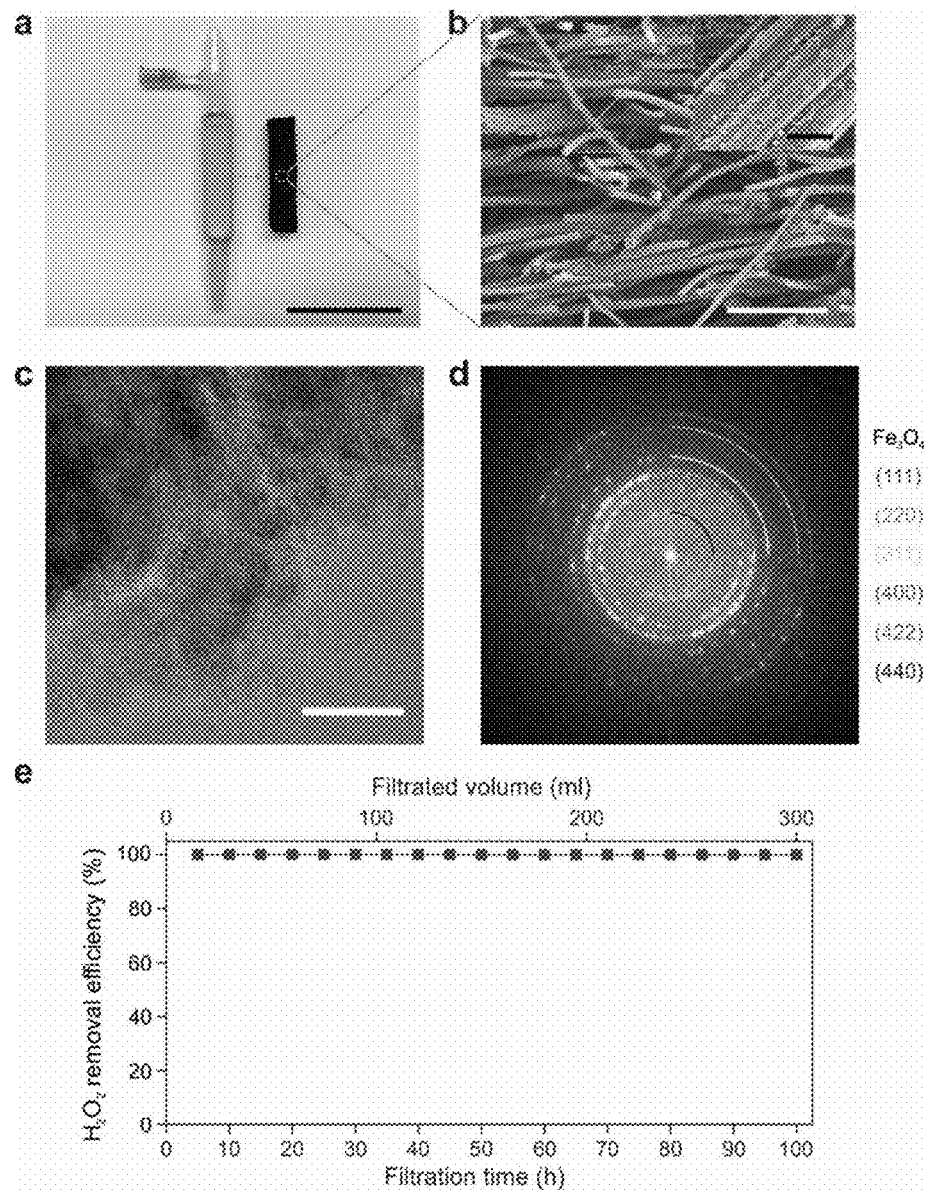
FIG. 17 shows an embodiment of the Fe₃O₄-carbon filter.

In this final section, combination is made of the two aforementioned components, the Fenton filter and the $H_2O_2$ electrolyzer, to present an improved system as a substitute for comparative AOPs to treat organic contaminants in wastewater. FIG. 6a shows the schematic of the system, which includes five stages: (i) The $H_2O_2$ electrolyzer generates $H_2O_2$ in an about 0.1 M $Na_2SO_4$ solution by consuming electricity and air; (ii) The produced $H_2O_2$ solution is added into the polluted water and mixed thoroughly; (iii) The mixed solution flows through a Fenton filter, where organic contaminants are oxidized; (iv) The solution further flows through a $Fe_3O_4$-carbon filter, where the residual $H_2O_2$ is quenched; (v) The treated effluent is discharged to the environment. The $Fe_3O_4$-carbon filter was fabricated by a similar process as used for fabricating the Fenton filter. It has the same exterior appearance as the Fenton filter, yet is loaded with a different catalyst (FIGS. 17a and 17b). Specifically, $Fe_3O_4$ nanoparticles embedded in amorphous carbon (FIGS. 17c and 17d) were synthesized and attached to the filter substrate to catalyze the disproportionation of $H_2O_2$. To characterize the performance of the filter for removing $H_2O_2$, an about 1 g/L $H_2O_2$ solution is passed through the filter at a flow rate of about 3 mL/h and recordation is made of the $H_2O_2$ concentration in the effluent. FIG. 17e shows that the $Fe_3O_4$-carbon filter has a very high $H_2O_2$ removal efficiency (>about 99.9%) over about 100 h of operation.

Finally, investigation is made of the feasibility of the whole system to treat a synthetic contaminated wastewater, prepared with deionized water and containing a mixture of about 10 ppm triclosan (antiseptic), about 10 ppm 17α-ethinyl estradiol (estrogenic birth control medication) and about 10 ppm cefazolin sodium (antibiotic). The $H_2O_2$ electrolyzer was operated at a working current of about 100 mA and an electrolyte flow rate of about 5 mL/h, generating about 10 g/L $H_2O_2$ in an about 0.1 M $Na_2SO_4$ solution. This solution was mixed with the synthetic polluted water with a volume ratio of about 1:9. Then, the mixed solution was successively flowed through the Fenton filter and the $Fe_3O_4$-carbon filter at a flow rate of about 3 mL/h. The system was operated for about 100 hours continuously, treating about 270 mL of the synthetic polluted water and generating about 300 mL of effluent. Measurement is made of the impact of the treatment on the toxicological profile of the organic contaminants by conducting a zebrafish embryo teratogenicity analysis. The synthetic polluted water, the treated effluent and deionized water (blank control) were respectively added into the standard E3 medium with a volume ratio of about 1:2. Then, zebrafish zygotes were added to each medium and cultured for six days. FIGS. 6b and c show that the synthetic polluted water caused acute toxicity with adverse effects on hatching and survival, while the treated effluent showed no noticeable difference with the blank control and led to a normal embryo development. Although this in vivo experiment has constraints, it corroborates that the treatment system significantly mitigated the teratogenicity of the three studied chemicals, without generating noticeable toxic byproducts.

Conclusions

In this exemplary disclosure, presentation is made of strategies to address the two fundamental challenges facing comparative AOPs: (i) the activation and (ii) the production of $H_2O_2$. Firstly, a comprehensive study is carried out to highlight the wide technological potential of single atoms stabilized in appropriate host matrices for the heterogeneous Fenton reaction, by investigating the reaction kinetics, the degradation byproducts and the catalytic mechanism. Identification is made of Cu—$C_3N_4$ as a desired catalyst and further demonstration is made of a Fenton filter by synthesizing the catalyst onto a porous substrate. The superior activity and stability of Cu—$C_3N_4$ affords the Fenton filter to maintain 100% dye removal efficiency after about 200 h of operation. Secondly, fabrication is made of a $H_2O_2$ electrolyzer which can continuously produce a pH-neutral about 10 g/L $H_2O_2$ solution at a total cost of about \$4.66/m$^3$, by consuming just electricity and air, which makes it practical for on-site production and readily scalable for a broad array of decentralized applications. The high performance is attributed to the high activities of the catalysts, the improved PE-carbon GDE, and the three-chamber flow reactor design. Finally, the Fenton filter and the $H_2O_2$ electrolyzer are coupled together and demonstration is made of an improved system for organic wastewater treatment. Compared with comparative AOPs, the system reduces the energy and chemical input demands and is suitable for implementation in remote areas and isolated communities.

Methods

1. Materials Preparation

Synthesis of Cu—$C_3N_4$. Typically, about 2 g of about 50 wt. % cyanamide aqueous solution (Alfa-Aesar) and about 0.287 g of $Cu(NO_3)_2$·$3H_2O$ (Sigma-Aldrich) were added to an about 10 mL glass vial. The mouth of the vial was covered by a piece of aluminum foil with four fine holes poked in it. The vial was then placed in a muffle furnace, heated to about 550° C. in about 40 min and maintained at this temperature for about 1 h. The Cu content in Cu—$C_3N_4$ can be tailored by altering the mole ratio of Cu/C in the precursors.

Fabrication of Fenton filter. A precursor solution was first prepared by dissolving about 1.436 g of $Cu(NO_3)_2$·$3H_2O$ (Sigma-Aldrich) into about 10 g of about 50 wt. % cyanamide aqueous solution (Alfa-Aesar). A piece of carbon felt (Alfa-Aesar) of cross-sectional area of about 1 cm$^2$ and length of about 5 cm was treated by $O_2$ plasma for about 5 min and then dipped in the precursor solution. About 4.5 g of the precursor solution was absorbed by the carbon felt. Excess solution was gently squeezed out. The carbon felt was wrapped by a piece of aluminum foil without drying, and then placed in a tube furnace, heated to about 550° C. in about 40 min under about 1 a.t.m. Ar atmosphere and maintained at this temperature for about 1 h. The side faces of the carbon felt were then sealed by epoxy (Devcon 5 Minute Epoxy) and wrapped by a piece of duct tape (3M).

Synthesis of Cu-TMCPP. Cu-TMCPP was synthesized according to a previous report with minor modification. About 3.0 g of Pyrrole (ACROS Organics) and about 6.9 g of methyl p-formylbenzoate (ACROS Organics) were added to about 100 mL of refluxed propionic acid (Fisher Chemical). The solution was refluxed for about 12h with a stirring bar. Then, crystals were collected by suction-filtration to afford purple crystals (TMCPP, about 1.9 g, about 21.3% yield). About 0.854 g of TMCPP and about 2.2 g of $CuCl_2 \cdot 2H_2O$ (Sigma-Aldrich) were dissolved in about 100 mL of DMF (Fisher Chemical). The solution was refluxed for about 6 h. After the mixture was cooled, about 150 mL of deionized water was added. The obtained precipitate was filtered and repeatedly washed with deionized water and methanol. The solid was dissolved in $CHCl_3$, followed by washing three times with deionized water. The organic layer was dried over anhydrous magnesium sulfate (Sigma-Aldrich) and evaporated to afford dark red crystals (Cu-TMCPP).

Synthesis of O-SP. O-SP was synthesized as follows. About 0.2 g of Super P™ carbon black (Alfa-Aesar) and about 200 mL of about 12 M nitric acid (Sigma-Aldrich) were added to a three-necked and round-bottomed glass flask, which was connected with a reflux condenser. The reaction flask, a magnetic stirrer and a thermometer were mounted in a preheated water bath. The temperature was kept at about 80° C. for about 48 h. Afterward, the slurry was taken out, cooled, centrifuged and washed with deionized water and ethanol several times until the pH was neutral. Finally, the sample was dried at about 60° C. in a vacuum oven overnight.

Fabrication of GDE. High-density polyethylene (Sigma-Aldrich) was mixed with ultrahigh molecular weight polyethylene (Alfa-Aesar) at a weight ratio of about 4:1 in paraffin oil (light, Fisher Chemical) at the temperature of about 200° C. The volume of paraffin oil was about five times the weight of polyethylene. The composite mixture was melt-pressed into a thin film at about 80° C. A piece of carbon paper (AvCarb MGL190) was then laminated with the film by melt-pressing again. Finally, the paraffin oil was extracted out from the film using methylene chloride (Fisher Chemical).

Fabrication of $IrO_2$ anode. $IrO_2$ was anodically electrodeposited on a titanium screen mesh as follows. To prepare the electrodeposition solution, about 0.15 g of $IrCl_4 \cdot H_2O$ (Sigma-Aldrich) was dissolved in about 100 mL of deionized water. Then, about 0.5 g of oxalic acid (Sigma-Aldrich) and about 1 mL of hydrogen peroxide aqueous solution (about 30 wt. %, Sigma-Aldrich) were added. After about 10 min of stirring, the pH was slowly raised to about 10.5 by stepwise addition of $K_2CO_3$ (Sigma-Aldrich). After preparation, the solution was heated to about 90° C. for about 15 min and subsequently cooled down to room temperature. Electrodeposition of $IrO_2$ was carried out by applying a substantially constant current (about 0.16 $mA/cm^2$) on a titanium mesh (Fuel Cell Store) in a two-electrode cell for about 15 min, with a graphite rod (Sigma-Aldrich) as the counter electrode.

Fabrication of $Fe_3O_4$-carbon filter. A precursor solution was first prepared by dissolving about 4 g of $Fe(NO_3)_3 \cdot 9H_2O$ (Sigma-Aldrich) and about 0.4 g of polyvinylpyrrolidone (PVP, Sigma-Aldrich) into about 5.6 mL of deionized water. A piece of carbon felt (Alfa-Aesar) of cross-sectional area of about 1 $cm^2$ and length of about 5 cm was treated by $O_2$ plasma for about 5 min and then dipped in the precursor solution. About 4.5 g of the precursor solution was absorbed by the carbon felt. Excess solution was gently squeezed out. The carbon felt was dried at about 60° C. in a vacuum oven overnight. After drying, the carbon felt was placed in a tube furnace, heated to about 500° C. in about 1 h under about 1 a.t.m. Ar atmosphere and maintained at this temperature for about 1.5 h. The side faces of the carbon felt were then sealed by epoxy (Devcon 5 Minute Epoxy) and wrapped by a piece of duct tape (3M).

2. Materials Characterizations

Electron Microscopy. The SEM images were taken using an FEI XL30 Sirion SEM with an acceleration voltage of about 5 kV. The HR-TEM images and EDS mapping were taken by a FEI Titan 80-300 environmental (scanning) TEM operated at about 300 keV. The HAADF-STEM images were taken on a TEAM 0.5 Microscopy operated at about 300 kV. The samples were prepared by dropping catalyst powder dispersed in ethanol onto carbon-coated copper (or gold) TEM grids (Ted Pella) using micropipettes and were dried under ambient conditions. For imaging, copper TEM grids were used. For EDS, gold TEM grids were used.

Spectroscopy. The Cu K-edge EXAFS spectra were collected at Beamline 4-3 of Stanford Synchrotron Radiation Lightsource (SSRL). Cu K-edge is operated in the range of about 8.878 keV to about 9.778 keV in fluorescence mode with a step-size of about 0.25 eV at the near edge. The XPS spectra were collected using a PHI VersaProbe Scanning XPS Microprobe with an Al (Kα) source. The FTIR spectra were measured using a Nicolet iS50 FT/IR spectrometer in the attenuated total reflectance mode. The UV-PESA spectrum was taken using a Riken AC-2 Photoelectron Spectrometer. The UV-vis DRS spectra were measured using an Agilent Cary 6000i UV/Vis/NIR Spectrometer equipped with diffusive reflectance accessory. Zeta potential was measured using a Brookhaven Instrument Nanobrook Omni Photon Correlation Spectroscopy.

3. Catalytic Activity Measurement of $Cu-C_3N_4$

Experimental procedure. All the experiments were conducted under dark conditions to eliminate the effect of photocatalysis. In a typical vial experiment, about 1 g/L of prepared catalyst powder was dispersed in about 10 mL of about 10 μM RhB aqueous solution. The pH was then adjusted to about 7 using about 1 M NaOH aqueous solution or about 1 M $H_2SO_4$ aqueous solution. After establishing adsorption/desorption equilibrium (about 10 min), about 1 g/L of $H_2O_2$ was added to the pollutant suspension under stirring throughout the experiment. At time intervals, about 1 mL of the suspension was collected and centrifuged at about 10,000 rpm for about 30 s. About 400 μL of the supernatant was then sampled and analyzed immediately.

Analytical methods. The pollutant concentration was measured by a HPLC (Agilent 1260) equipped with a UV detector and a Zorbax Eclipse SB-C18 column (2.7 μm, 3.0×50 mm). The sample injection volume was about 50 μL. Isocratic mobile phase contained about 40% of about 5 mM $H_2SO_4$: about 60% methanol (v:v) with a flow rate of about 0.7 mL/min. The detector wavelength was set at about 554 nm for measuring RhB, and at about 665 nm for measuring MB. The degradation products of RhB were analyzed using a LC-MS (Agilent 6460 Triple Quad LC-MS equipped with Agilent 1260 LC front-end). The sample injection volume was about 50 μL. The samples were chromatographically separated using the Zorbax Eclipse SB-C18 column at a flow rate of about 0.2 mL/min. The mobile phase contained about 5 mM $H_2SO_4$ and methanol. The volume percent of methanol was decreased from about 80% to about 50% within about 9 min. The electrospray ionization-mass spectrometry analysis was performed in positive mode. The TOC was determined by a Shimadzu TOC-L analyzer using high-temperature combustion. The concentration of $Cu^{2+}$ was measured using ICP-MS on a Thermo Scientific XSeries II.

4. Electrochemical Measurements

The electrochemical experiments were conducted at about 25° C. in a H-type electrochemical cell separated by a Nafion 117 membrane (Chemours). A Pt plate was used as the counter electrode when testing the 2e-ORR electrode (O-SP @ GDE). A graphite rod (Sigma-Aldrich) was used as the counter electrode when testing the OER electrode (IrO$_2$ @ titanium mesh). Both the working and reference electrodes were placed in one side of the H-type cell. A computer-controlled Bio-Logic VSP Potentiostat was used for all electrochemical experiments. CV and LSV tests were performed by sweeping the working electrode potential from open circuit potential at a scan rate of about 10 mV/s. All the potentials were measured against a saturated calomel reference electrode (SCE) and converted to the RHE reference using: E (versus RHE)=E (versus SCE)+0.240 V+0.0591 V×pH. The potentials were also iR corrected to compensate for the ohmic electrolyte resistance by using the E-iR relation, where i is the current and R is the electrolyte resistance measured via high-frequency AC impedance.

5. Quantification of $H_2O_2$

The $H_2O_2$ concentration was measured by a $Ce(SO_4)_2$ titration method based on the mechanism that a yellow solution of $Ce^{4+}$ would be reduced by $H_2O_2$ to colorless $Ce^{3+}$. $Ce(SO_4)_2$ solution (about 1 mM) was prepared by dissolving about 33.2 mg of $Ce(SO_4)_2$ in about 100 mL of about 0.5 M $H_2SO_4$ solution. To obtain the calibration curve, $H_2O_2$ with known concentration was added to the $Ce(SO_4)_2$ solution and measured by an Agilent Cary 6000i UV/Vis/NIR Spectrometer at about 316 nm. Based on the linear relationship between the signal intensity and the $Ce^{4+}$ concentration, the $H_2O_2$ concentrations of the samples could be obtained.

6. Teratogenicity Studies in Zebrafish Embryos

Media preparation. Three fish culture media were prepared by adding the synthetic polluted water, the treated effluent, or deionized water (blank control) into the standard E3 medium with a volume ratio of about 1:2. E3 medium contains about 5 mM NaCl, about 0.17 mM KCl, about 0.33 mM $CaCl_2$, and about 0.33 mM $MgSO_4$.

Embryo cultures. All animal procedures were performed according to NIH guidelines and approved by the Committee on Administrative Panel on Laboratory Animal Care (APLAC) at Stanford University. Zebrafish zygotes were obtained from wild-type adults and cultured in standard E3 medium at about 28° C. Dead and unfertilized eggs were discarded at about 4 hours post fertilization (hpf), while fertilized embryos were transferred into three 10-cm culture dishes with about 120 embryos per dish. The E3 medium was carefully removed from each dish, and the embryos were then rinsed twice with about 3 mL of medium containing either the synthetic polluted water, the treated effluent, or deionized water. Each dish was then filled with about 39 mL of the corresponding medium, and the embryos were gently transferred into 96-well plates (one embryo in about 300 μL of medium per well), and cultured at about 28° C. Embryo development was monitored and representative images were acquired at 24, 48, 72, 96, 120 and 144 hpf.

Band Edge Positions of Cu—$C_3N_4$.

Figure 18:
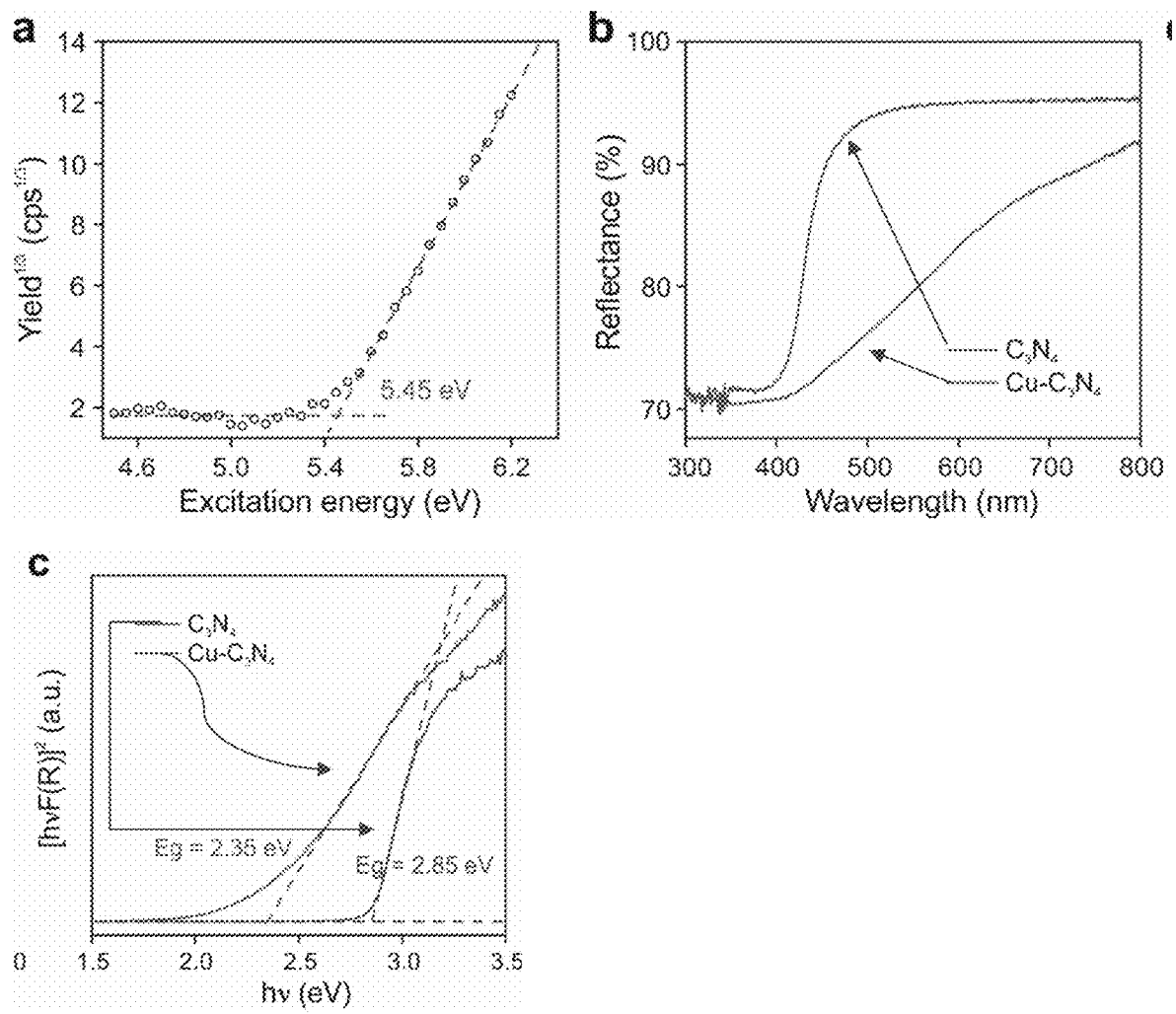
FIG. 18 shows an embodiment of the Band edge positions of Cu—C₃N₄.

Utilization is made of UV photoelectron spectroscopy in air (UV-PESA) to determine the valence band energy ($E_{VB}$). As shown in FIG. 18a, the $E_{VB}$ of Cu—$C_3N_4$ is estimated by linear extrapolation to be about −5.45 eV vs. vacuum level ($E_{vac}$, the energy of the electron at rest in vacuum just outside of the surface of Cu—$C_3N_4$). Then, UV-visible diffuse reflectance spectroscopy (UV-vis DRS) was applied to probe the band gap ($E_g$). FIG. 18c shows the Kubelka-Munk transformed UV-vis DRS spectra, where an exponent of 2 gives a good fit, claiming Cu—$C_3N_4$ and $C_3N_4$ as direct band gap materials. The linear extrapolation yields E g values of about 2.85 eV for $C_3N_4$ and about 2.35 eV for Cu—$C_3N_4$, respectively. Therefore, the conduction band energy ($E_{CB}$) of Cu—$C_3N_4$ is estimated to be about −3.10 eV vs. $E_{vac}$. Besides, it is noteworthy that the UV-vis DRS spectrum of Cu—$C_3N_4$ (FIG. 18b) shows a broad absorption above about 500 nm, which implies that the incorporation of Cu not only narrows the band gap but also introduces intermediate states within the band gap.

Alignment Between the Absolute Energy Scale and the Electrochemical Potential Scale.

In order to compare the band edge positions of Cu—$C_3N_4$ with the redox potentials of reactive species in solution and draw them in one energy diagram (FIG. 2e), conversion is made of [E vs. $E_{vac}$ (eV)] to [φ vs. $\varphi_{SHE}$ (V)] by following derivation:

First of all, a general relation between E (energy) and φ (potential) is given as:

$$E = -e\varphi \tag{1}$$

Given that:

$$E_{SHE} = E_{vac}^S - 4.44 \text{ eV} \tag{2}$$

where $E_{vac}^S$ is the energy of the electron at rest in vacuum just outside of the surface of the solution. $E_{vac}^S$ is different from $E_{vac}$ because of the potential drop between the inner and outer Helmholtz layers, called Helmholtz double layer potential ($\varphi_H$).

$$E_{vac} = E_{vac}^S - e\varphi_H \tag{3}$$

Figure 19:
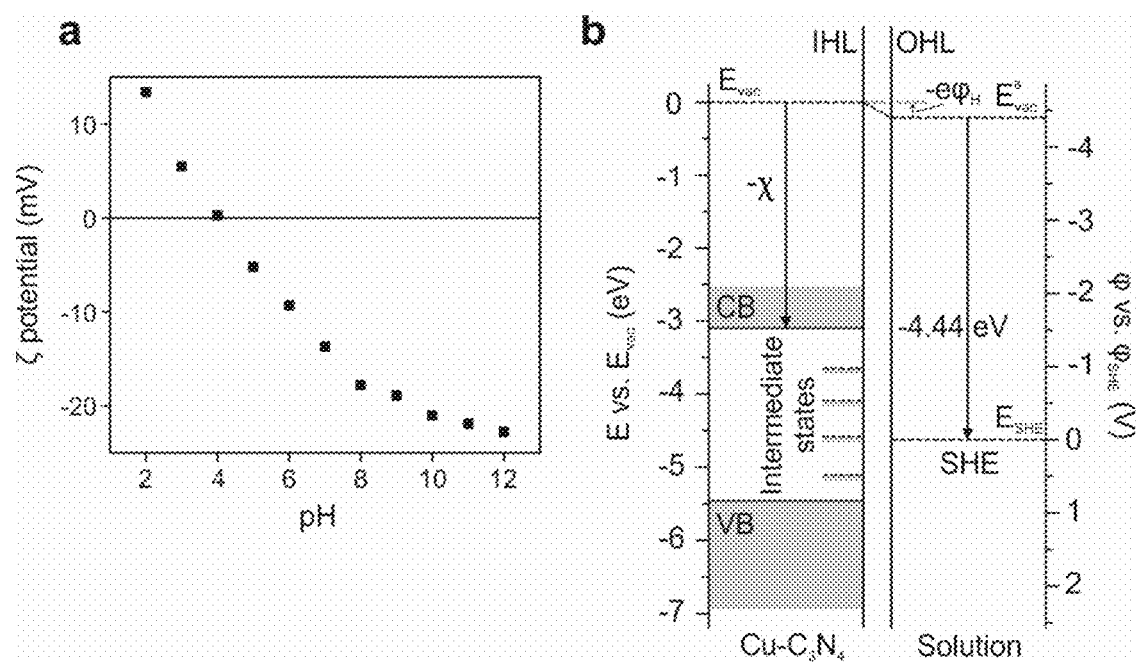
FIG. 19 shows an embodiment of the alignment between the absolute energy scale and the electrochemical potential scale.

$\varphi_H$ cannot be directly measured but can be determined by:

$$\varphi_H = \frac{2.3kT}{e}[\text{pH}(I) - \text{pH}] = 0.059(\text{pH}_{PZZP} - \text{pH}) \tag{4}$$

where $\text{pH}_{PZZP}$ is the pH of the point of zero ζ potential. Measurement is made of the dependence of the ζ potential of Cu—$C_3N_4$ on pH. FIG. 19a shows that the $\text{pH}_{PZZP}$ of Cu—$C_3N_4$ is 4.

Derivation of the conversion relationship is as follows:

$$[E \text{ vs. } E_{vac}] = E - E_{vac} = E - E_{vac}^S - e\varphi_H = E - E_{SHE} - 4.44 \text{ eV} + e\varphi_H = -e\varphi + e\varphi_{SHE} - 4.44 \text{ eV} + e\varphi_H = e\{-[(\varphi \text{ vs. } \varphi_{SHE}] - 4.44 \text{ V} + \varphi_H\} \tag{5}$$

For pH=7, $$[E \text{ vs. } E_{vac}] = -]\varphi \text{ vs. } \varphi_{SHE} - 4.617 \tag{6}$$

The above derivation can be visualized in the schematic in FIG. 19b.

As used herein, the singular terms "a," "an," and "the" include plural referents unless the context clearly dictates otherwise. Thus, for example, reference to an object can include multiple objects unless the context clearly dictates otherwise.

As used herein, the terms "connect," "connected," and "connection" refer to an operational coupling or linking. Connected objects can be directly coupled to one another or can be indirectly coupled to one another, such as via one or more other objects.

As used herein, the terms "substantially," "substantial," "approximately," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be deemed to be "substantially" the same or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A Fenton filter comprising:
a porous substrate and a catalyst coating the porous substrate, wherein the catalyst includes a matrix and single metal atoms incorporated in the matrix, wherein the matrix includes heterocycles bonded to one another.

2. The Fenton filter of claim 1, wherein the matrix includes an organic material.

3. The Fenton filter of claim 1, wherein the heterocycles include carbon-nitrogen heterocycles.

4. The Fenton filter of claim 1, wherein the heterocycles are aromatic.

5. The Fenton filter of claim 1, wherein the heterocycles include heptazine units.

6. The Fenton filter of claim 1, wherein the matrix includes graphitic carbon nitride.

7. The Fenton filter of claim 1, wherein the single metal atoms include single transition-metal atoms.

8. The Fenton filter of claim 7, wherein the single metal atoms include single copper atoms.

9. The Fenton filter of claim 1, wherein the single metal atoms have non-zero oxidation states.

10. The Fenton filter of claim 1, wherein the single metal atoms are incorporated within coordination sites in the matrix.

11. The Fenton filter of claim 1, wherein the single metal atoms are spaced apart from one another in the matrix.

12. The Fenton filter of claim 1, wherein a molar ratio of the single metal atoms to carbon atoms included in the matrix is in a range of about 1/50 or greater, about 1/40 or greater, about 1/30 or greater, or about 1/20 or greater, and up to about 1/10 or greater.

13. The Fenton filter of claim 1, wherein the porous substrate is fibrous and includes fibers, and the fibers are coated with the catalyst.

14. A method of generating radicals from an oxidant includes providing the Fenton filter of claim 1, and passing a solution including the oxidant through the Fenton filter to generate radicals from the oxidant.

15. The method of claim 14, wherein the oxidant includes hydrogen peroxide.

16. The method of claim 15, wherein the radicals include hydroxyl radicals.

17. An electrolyzer comprising:
a gas chamber;
an oxygen evolution reaction (OER) chamber fluidly connected to the gas chamber;
an oxygen reduction reaction (ORR) chamber disposed between the gas chamber and the OER chamber;
a gas diffusion electrode disposed between the gas chamber and the ORR chamber;
a proton exchange membrane disposed between the ORR chamber and the OER chamber;
an anode disposed in the OER chamber; and
an electrical power source connected to the gas diffusion electrode and the anode.

18. The electrolyzer of claim 17, wherein the gas diffusion electrode includes a porous current collector, a gas diffusion layer coating a first side of the porous current collector, and an ORR catalyst incorporated in the porous current collector.

19. The electrolyzer of claim 18, wherein the gas diffusion layer faces toward the gas chamber, and a second, opposite side of the porous current collector faces toward the ORR chamber.

20. The electrolyzer of claim 18, wherein the porous current collector is fibrous and includes fibers, and the ORR catalyst is incorporated in spaces between the fibers.

21. The electrolyzer of claim 18, wherein the gas diffusion layer is a porous polymer layer.

22. The electrolyzer of claim 21, wherein the gas diffusion layer is a porous polyolefin layer.

23. The electrolyzer of claim 18, wherein a pore size of the gas diffusion layer is smaller than a pore size of the porous current collector.

24. The electrolyzer of claim 18, wherein the ORR catalyst includes oxidized carbon particles.

25. The electrolyzer of claim 17, wherein the anode includes a current collector and an OER catalyst coating the current collector.

26. The electrolyzer of claim 25, wherein the current collector is a metallic mesh.

27. The electrolyzer of claim 25, wherein the OER catalyst includes a metal oxide.

28. A method of generating hydrogen peroxide comprising:
providing the electrolyzer of claim 17;
conveying air into the OER chamber to generate oxygen;
conveying oxygen from the OER chamber to the gas chamber; and conveying an electrolyte through the ORR chamber to generate hydrogen peroxide resulting from reduction of oxygen from the gas chamber passing through the gas diffusion electrode.

29. A water treatment system comprising:

an electrolyzer and a Fenton filter fluidly connected to and downstream from the electrolyzer, wherein the electrolyzer comprises:
- a gas chamber;
- an oxygen evolution reaction (OER) chamber fluidly connected to the gas chamber;
- an oxygen reduction reaction (ORR) chamber disposed between the gas chamber and the OER chamber;
- a gas diffusion electrode disposed between the gas chamber and the ORR chamber;
- a proton exchange membrane disposed between the ORR chamber and the OER chamber;
- an anode disposed in the OER chamber; and
- an electrical power source connected to the gas diffusion electrode and the anode, and wherein the Fenton filter comprises:
- a porous substrate and a catalyst coating the porous substrate, wherein the catalyst includes a matrix and single metal atoms incorporated in the matrix.

30. The water treatment system of claim 29, further comprising an oxidant filter fluidly connected to and downstream from the Fenton filter.

31. The water treatment system of claim 30, wherein the oxidant filter includes a porous substrate and a disproportionation catalyst coating the porous substrate.

32. The water treatment system of claim 31, wherein the disproportionation catalyst includes a metal oxide.

33. The water treatment system of claim 31, wherein the porous substrate is fibrous and includes fibers, and the fibers are coated with the disproportionation catalyst.

* * * * *